(12) United States Patent
Poon

(10) Patent No.: US 9,058,094 B2
(45) Date of Patent: Jun. 16, 2015

(54) METHOD AND APPARATUS FOR FACILITATING USER SELECTION OF AN ITEM CATEGORY IN AN ONLINE AUCTION

(71) Applicant: eBay Inc., San Jose, CA (US)

(72) Inventor: Alex Dai-Shun Poon, Los Altos Hills, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/218,425

(22) Filed: Mar. 18, 2014

(65) Prior Publication Data

US 2014/0325453 A1 Oct. 30, 2014

Related U.S. Application Data

(63) Continuation of application No. 09/491,703, filed on Jan. 26, 2000, now Pat. No. 8,781,940.

(51) Int. Cl.
| | |
|---|---|
| *G06F 7/00* | (2006.01) |
| *G06F 3/0482* | (2013.01) |
| *G06Q 30/06* | (2012.01) |
| *G06Q 30/08* | (2012.01) |

(52) U.S. Cl.
CPC .......... *G06F 3/0482* (2013.01); *G06Q 30/0601* (2013.01); *G06Q 30/08* (2013.01)

(58) Field of Classification Search
CPC .............. G06Q 30/0253; G06Q 30/06; G06Q 30/0256; G06Q 30/0273; G06Q 30/0277
USPC .......... 705/1.1, 14.51, 14.54, 1.69, 37, 10, 14
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |

(Continued)

FOREIGN PATENT DOCUMENTS

| | | |
|---|---|---|
| CA | 2253543 A1 | 3/1997 |
| FR | 2658635 A1 | 8/1991 |

(Continued)

OTHER PUBLICATIONS

"U.S. Appl. No. 09/491,703, Appeal Brief filed Jan. 2, 2013", 16 pgs.

(Continued)

*Primary Examiner* — Mcdieunel Marc
(74) *Attorney, Agent, or Firm* — Schwegmann Lundberg & Woessner, P.A.

(57) ABSTRACT

A method and apparatus are disclosed for facilitating category selection by a user in a computerized auction. A category field is provided, containing a plurality of category entries used to categorize an item in the auction. One category entry is selected in the category field and at least one subcategory field is provided, containing a plurality of subcategory entries also used to categorize the item in the auction, the subcategory entries corresponding to the one selected category entry of the plurality of category entries. At least one subcategory entry corresponding to the one selected category entry is further selected in the at least one subcategory field for further processing.

20 Claims, 42 Drawing Sheets

(56) References Cited

U.S. PATENT DOCUMENTS

| | | |
|---|---|---|
| 4,789,928 A | 12/1988 | Fujisaki |
| 4,799,156 A | 1/1989 | Shavit et al. |
| 4,823,265 A | 4/1989 | Nelson |
| 4,864,516 A | 9/1989 | Gaither et al. |
| 4,903,201 A | 2/1990 | Wagner |
| 4,990,005 A | 2/1991 | Karakawa |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,546,575 A | 8/1996 | Potter et al. |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,715,444 A | 2/1998 | Danish et al. |
| 5,717,989 A | 2/1998 | Tozzoli et al. |
| 5,721,832 A | 2/1998 | Westrope |
| 5,722,418 A | 3/1998 | Bro |
| 5,727,165 A | 3/1998 | Ordish et al. |
| 5,742,768 A | 4/1998 | Gennaro et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,255 A | 12/1998 | Mayaud |
| 5,845,265 A | 12/1998 | Woolston |
| 5,845,266 A | 12/1998 | Lupien et al. |
| 5,848,399 A | 12/1998 | Burke |
| 5,850,442 A | 12/1998 | Muftic |
| 5,872,848 A | 2/1999 | Romney et al. |
| 5,873,069 A | 2/1999 | Reuhl et al. |
| 5,874,412 A | 2/1999 | Priebe et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,968,110 A | 10/1999 | Westrope |
| 5,983,219 A | 11/1999 | Danish et al. |
| 5,991,739 A | 11/1999 | Cupps et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,167,382 A | 12/2000 | Sparks et al. |
| 6,178,408 B1 | 1/2001 | Copple et al. |
| 6,192,407 B1 | 2/2001 | Smith et al. |
| 6,202,051 B1 | 3/2001 | Woolston |
| 6,236,400 B1 | 5/2001 | Guerrero |
| 6,243,691 B1 | 6/2001 | Fisher et al. |
| 6,256,028 B1 | 7/2001 | Sanford et al. |
| 6,266,514 B1 | 7/2001 | O'Donnell |
| 6,275,821 B1 | 8/2001 | Danish et al. |
| 6,307,573 B1 | 10/2001 | Barros |
| 6,356,899 B1 | 3/2002 | Chakrabarti et al. |
| 6,397,221 B1 | 5/2002 | Greef et al. |
| 6,405,175 B1 | 6/2002 | Ng |
| 6,449,601 B1 | 9/2002 | Friedland et al. |
| 6,462,762 B1 | 10/2002 | Ku et al. |
| 6,466,918 B1 | 10/2002 | Spiegel et al. |
| 6,489,968 B1 | 12/2002 | Ortega et al. |
| 6,496,843 B1 | 12/2002 | Getchius et al. |
| 6,518,984 B1 | 2/2003 | Maeckel et al. |
| 6,901,403 B1 | 5/2005 | Bata et al. |
| 6,934,690 B1 | 8/2005 | Van Horn et al. |
| 7,035,864 B1 | 4/2006 | Ferrari et al. |
| 7,191,147 B2* | 3/2007 | Heene et al. ............... 705/14.51 |
| 7,398,229 B2* | 7/2008 | Budish ........................ 705/26.3 |
| 7,839,385 B2 | 11/2010 | Hunleth et al. |
| 8,082,184 B2* | 12/2011 | Yruski et al. ................ 705/26.3 |
| 8,549,407 B2 | 10/2013 | O'Neil |
| 8,670,993 B2* | 3/2014 | Henley ............................... 705/2 |
| 8,781,940 B2* | 7/2014 | Poon .............................. 705/37 |
| 2002/0062265 A1* | 5/2002 | Poon .............................. 705/27 |
| 2002/0138481 A1 | 9/2002 | Aggarwal et al. |
| 2003/0041004 A1* | 2/2003 | Parry et al. .................... 705/37 |
| 2003/0061122 A1 | 3/2003 | Berkowitz et al. |
| 2003/0065737 A1 | 4/2003 | Aasman |
| 2004/0153371 A1 | 8/2004 | Razumov |
| 2004/0254853 A1* | 12/2004 | Heene et al. .................. 705/26 |
| 2005/0071251 A1 | 3/2005 | Linden et al. |
| 2005/0216362 A1 | 9/2005 | Navar et al. |
| 2005/0273417 A1* | 12/2005 | Budish .......................... 705/37 |
| 2006/0085253 A1* | 4/2006 | Mengerink et al. ........... 705/14 |
| 2006/0167251 A1 | 7/2006 | Chakraborty et al. |
| 2006/0173742 A1* | 8/2006 | Heene ............................ 705/14 |
| 2007/0073591 A1 | 3/2007 | Perry et al. |
| 2008/0091553 A1 | 4/2008 | Koski |
| 2008/0120291 A1 | 5/2008 | Delgo et al. |
| 2009/0150717 A1 | 6/2009 | Garcia et al. |
| 2009/0248635 A1* | 10/2009 | Gross ............................... 707/3 |
| 2011/0029403 A1* | 2/2011 | Xu ............................... 705/26.7 |
| 2013/0013440 A1* | 1/2013 | Raghavan ..................... 705/26.3 |
| 2013/0125236 A1* | 5/2013 | Lalonde et al. ................ 726/22 |
| 2013/0268561 A1* | 10/2013 | Christie et al. ................ 707/777 |
| 2013/0290125 A1* | 10/2013 | Raghavan ..................... 705/26.3 |
| 2014/0040753 A1 | 2/2014 | Garcia |
| 2014/0142973 A1* | 5/2014 | Henley ............................... 705/2 |

FOREIGN PATENT DOCUMENTS

| | | |
|---|---|---|
| NL | 9300266 A | 9/1994 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |
| WO | WO-9963461 A1 | 12/1999 |

OTHER PUBLICATIONS

"U.S. Appl. No. 09/491,703 , Response filed Oct. 1, 2012 to Final Office Action mailed Jun. 29, 2012", 12 pgs.

"U.S. Appl. No. 09/491,703, Advisory Action mailed Jun. 17, 2008", 3 pgs.

"U.S. Appl. No. 09/491,703, Appeal Brief filed Sep. 29, 2008", 24 pgs.

(56) References Cited

OTHER PUBLICATIONS

"U.S. Appl. No. 09/491,703, Appeal Decision mailed Nov. 25, 2013", 7 pgs.
"U.S. Appl. No. 09/491,703, Final Office Action mailed Mar. 26, 2008", 9 pgs.
"U.S. Appl. No. 09/491,703, Final Office Action mailed Apr. 4, 2002", 44 pgs.
"U.S. Appl. No. 09/491,703, Final Office Action mailed May 31, 2006", 9 pgs.
"U.S. Appl. No. 09/491,703, Final Office Action mailed Jun. 29, 2012", 15 pgs.
"U.S. Appl. No. 09/491,703, Final Office Action mailed Aug. 14, 2001", 31 pgs.
"U.S. Appl. No. 09/491,703, Non Final Office Action mailed Jan. 4, 2011", 9 pgs.
"U.S. Appl. No. 09/491,703, Non Final Office Action mailed Jan. 26, 2006", 8 pgs.
"U.S. Appl. No. 09/491,703, Non Final Office Action mailed Feb. 27, 2007", 7 pgs.
"U.S. Appl. No. 09/491,703, Non Final Office Action mailed Mar. 14, 2001", 19 pgs.
"U.S. Appl. No. 09/491,703, Non Final Office Action mailed Oct. 19, 2007", 7 pgs.
"U.S. Appl. No. 09/491,703, Non Final Office Action mailed Dec. 12, 2001", 43 pgs.
"U.S. Appl. No. 09/491,703, Pre-Appeal Brief Request filed Jun. 26, 2008", 4 pgs.
"U.S. Appl. No. 09/491,703, Preliminary Amendment filed Oct. 11, 2002", 45 pgs.
"U.S. Appl. No. 09/491,703, Preliminary Amendment filed Nov. 14, 2001", 28 pgs.
"U.S. Appl. No. 09/491,703, Response filed Mar. 12, 2002 to Non Final Office Action mailed Dec. 12, 2001", 7 pgs.
"U.S. Appl. No. 09/491,703, Response filed Mar. 20, 2006 to Non Final Office Action mailed Jan. 26, 2006", 12 pgs.
"U.S. Appl. No. 09/491,703, Response filed May 27, 2008 to Final Office Action mailed Mar. 26, 2008", 14 pgs.
"U.S. Appl. No. 09/491,703, Response filed May 29, 2007 to Non Final Office Action mailed Feb. 27, 2007", 17 pgs.
"U.S. Appl. No. 09/491,703, Response filed May 4, 2012 to Non Final Office Action mailed Jan. 4, 2012", 12 pgs.
"U.S. Appl. No. 09/491,703, Response filed Jul. 13, 2001 to Non Final Office Action mailed Mar. 14, 2001", 39 pgs.
"U.S. Appl. No. 09/491,703, Response filed Jul. 27, 2005 to Restriction Requirement mailed Jun. 28, 2005", 18 pgs.
"U.S. Appl. No. 09/491,703, Response filed Nov. 30, 2006 to Final Office Action mailed May 31, 2006", 13 pgs.
"U.S. Appl. No. 09/491,703, Response filed Dec. 11, 2007 to Non-Final Office Action mailed Oct. 19, 2007", 13 pgs.
"U.S. Appl. No. 09/491,703, Restriction Requirement mailed Jun. 28, 2005", 5 pgs.
"U.S. Appl. No. 09/491,703, Supplemental Appeal Brief filed Sep. 8, 2009", 24 pgs.
"U.S. Appl. No. 09/953,749, Advisory Action mailed Jan. 7, 2010", 3 pgs.
"U.S. Appl. No. 09/953,749, Advisory Action mailed Nov. 20, 2003", 2 pgs.
"U.S. Appl. No. 09/953,749, Appeal Brief filed Feb. 5, 2010", 27 pgs.
"U.S. Appl. No. 09/953,749, Appeal Brief filed Feb. 15, 2006", 24 pgs.
"U.S. Appl. No. 09/953,749, Appeal Brief filed Apr. 11, 2005", 21 pgs.
"U.S. Appl. No. 09/953,749, Appeal Brief filed May 18, 2007", 27 pgs.
"U.S. Appl. No. 09/953,749, Appeal Brief filed Sep. 25, 2006", 25 pgs.
"U.S. Appl. No. 09/953,749, Examiner's Answer to Appeal Brief mailed Apr. 15, 2010", 7 pgs.
"U.S. Appl. No. 09/953,749, Final Office Action mailed Sep. 2, 2003", 6 pgs.
"U.S. Appl. No. 09/953,749, Final Office Action mailed Dec. 1, 2004", 5 pgs.
"U.S. Appl. No. 09/953,749, Non Final Office Action mailed Feb. 20, 2003", 8 pgs.
"U.S. Appl. No. 09/953,749, Non Final Office Action mailed May 25, 2006", 6 pgs.
"U.S. Appl. No. 09/953,749, Non Final Office Action mailed Jun. 18, 2004", 5 pgs.
"U.S. Appl. No. 09/953,749, Non Final Office Action mailed Jul. 1, 2005", 5 pgs.
"U.S. Appl. No. 09/953,749, Preliminary Amendment filed Jul. 3, 2002", 2 pgs.
"U.S. Appl. No. 09/953,749, Reply Brief filed Jun. 15, 2010", 8 pgs.
"U.S. Appl. No. 09/953,749, Reply Brief filed Nov. 8, 2007", 7 pgs.
"U.S. Appl. No. 09/953,749, Response filed Feb. 10, 2009 to Examiner's Answer mailed Dec. 10, 2008", 13 pgs.
"U.S. Appl. No. 09/953,749, Response filed Jun. 3, 2003 to Non Final Office Action mailed Feb. 20, 2003", 12 pgs.
"U.S. Appl. No. 09/953,749, Response filed Aug. 17, 2004 to Non Final Office Action mailed Jun. 18, 2004", 12 pgs.
"U.S. Appl. No. 09/953,749, Response filed Sep. 25, 2006 to Non Final Office Action mailed May 25, 2006", 19 pgs.
"U.S. Appl. No. 09/953,749, Response filed Nov. 3, 2003 to Final Office Action mailed Sep. 2, 2003", 13 pgs.
"U.S. Appl. No. 11/950,679, Advisory Action mailed Aug. 25, 2011", 3 pgs.
"U.S. Appl. No. 11/950,679, Final Office Action mailed Jun. 9, 2011", 26 pgs.
"U.S. Appl. No. 11/950,679, Non Final Office Action mailed Dec. 30, 2010", 23 pgs.
"U.S. Appl. No. 11/950,679, Notice of Allowance mailed Jun. 4, 2013", 24 pgs.
"U.S. Appl. No. 11/950,679, Response filed Mar. 30, 2011 to Non Final Office Action mailed Dec. 30, 2010", 17 pgs.
"U.S. Appl. No. 11/950,679, Response filed Sep. 8, 2011 to Advisory Action mailed Aug. 25, 2011", 15 pgs.
"U.S. Appl. No. 11/950,679, Response to Final Office Action Mailed Jun. 9, 2011", 13 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.
"Request for Ex Parte Reexamination of US Patent No. 6,275,821 mailed Oct. 28, 2008", 36 pgs.
Baumann, G. W, "Personal Optimized Decision/Transaction Program", IBM Technical Disclosure Bulletin, (Jan. 1995), 83-84.
Clemons, E., "Evaluating the prospects for alternative electronic securities", Proceedings of ICIS 91: 12th International Conference on Information Systems, (Dec. 16-18, 1991), 53-63.
Downing, D. A, et al., "Dictionary of Computer and Internet Terms", Sixth Edition, (1998), 175-177, 383-384.
Graham, Ian, "The Emergence of Linked Fish Markets in Europe", Electronic Markets. vol. 8, No. 2, (1998), 29-32.
Granacki, J., et al., "A Component Library Management System and Browser, Research Report ISI/RR-93-386", University of Southern California Information Sciences Institute, (Apr. 1993), p. 1-19.
Hauser, R., "Anonymous Delivery of Goods in Electronic Commerce", IBM Technical Disclosure Bulletin, 39(3), (Mar. 1996), 363-366.
Hess, C. M, et al., "Computerized Loan Organization System: An Industry Case Study of the Electronic Markets Hypothesis", MIS Quarterly, vol. 18(3), (Sep. 1994), 251-275.
Klein, Stefan, "Introduction to Electronic Auctions", Focus Theme, vol. 7, No. 4, (1997), 3-6.
Lee, H. G, "Electronic brokerage and electronic auction: the impact of IT on market structures", Proceedings of the Twenty-Ninth Hawaii International Conference on System Sciences, vol. 4, (1996), 397-406.

(56) References Cited

OTHER PUBLICATIONS

Lee, Ho Geun, "AUCNET: Electronic Intermediary for Used-Car Transactions", Focus Theme, Electronic Markets, vol. 7, No. 4, (1997), 24-28.
Malone, T., et al., "Electronic Markets and Electronic Hierarchies", Communications of the ACM, vol. 30, No. 6, (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management., (Jul. 1999), 3 pgs.
Neo, B. S, "The implementation of an electronic market for pig trading in Singapore", Journal of Strategic Information Systems; vol. 1(5), (Dec. 1992), 278-288.
Post, D. L., et al., "Application of auctions as a pricing mechanism for the interchange of electric power", IEEE Transactions on Power Systems, 10(3), (Aug. 1995), 1580-1584.
Preist, Chris, et al., "Adaptive Agents in a Persistent Shout Double Auction", International Conference on Information and Computation Economies, Proceedings of the first international conference on Information and computation economies, (1998), 11-18.
Reck, M., "Formally Specifying an Automated Trade Execution System", The Journal of Systems and Software, 1993, Elsevier Science Publishing, USA, (1993), 245-252.
Reck, Martin, "Trading-Process Characteristics of Electronic Auctions", Focus Theme, vol. 7, No. 4, (1997), 17-23.
Resnick, Paul, "Reputation systems", Communications of the ACM, 43(12), (Dec. 2000), 45-48.
Rockoff, T. E, et al., "Design of an Internet-based system for remote Dutch auctions", Internet Research: Electronic Networking Applications and Policy, vol. 5(4), (Jan. 1, 1995), 10-16.
Schmid, B. F, "The Development of Electronic Commerce", EM—Electronic Markets, No. 9-10, (Oct. 1993), 2 pgs.
Siegmann, Ken, "Nowhere to go but up", PC Week; vol. 12(42), Ziff-Davis Publishing Company, (Oct. 23, 1995), 1-3.
Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.
Turban, Efraim, "Auctions and Bidding on the Internet: An Assessment", Focus Theme, EM—Electronic Markets, vol. 7, No. 4, (1997), 7-11.
Van Heck, E., et al., "Experiences with Electronic Auctions in the Dutch Flower Industry", Focus Theme, Erasmus University, The Netherlands, (1996), 6 pgs.
Warbelow, A, et al., "Aucnet: TV Auction Network System", Harvard Business School Case/Study, HBVR#9-190-001, USA, (Jul. 1989), 1-16.
Zwass, V., "Electronic Commerce: Structures and Issues", International Journal of Electronic Commerce, Fall 1996, vol. 1, No. 1, (Fall 1996), 3-23.

\* cited by examiner

```
LANGUAGE="JAVASCRIPT1.1">
<!-- THE MESSAGE BELOW WILL DISPLAY ONLY ON NON-JS1.1 BROWSRS -->
<!-- --> <HR><H1>THIS PAGE REQUIRES JAVASCRIPT 1.1</H1>
<!-- --> PLEASE CONSIDER USING NETSCAPE 3.0/4.0 OR INTERNET EXPLORER 4.0
<!-- THIS HTML COMMENT HIDES THE SCRIPT FROM NON-JS1.1 BROWSERS

C = NEW ARRAY;
N = NEW ARRAY;
N[353]="ANTIQUES";
N[12]="GENERAL";
N[355]="ANCIENT WORLD";
N[1207]="ARCHITECTURAL";
N[2194]="ASIAN ANTIQUES";
N[2195]="BOOKS, MANUSCRIPTS";
N[356]="GENERAL";
N[2197]="AFRICAN";
N[2196]="AMERICAN";
N[2198]="ASIAN";
N[2200]="ENGLISH";
N[2201]="EUROPEAN";
N[2202]="LATIN AMERICAN";
N[2203]="CERAMICS";
N[2207]="ETHNOGRAPHIC";
N[2204]="GENERAL";
N[4171]="AFRICAN ";
N[4170]="LATIN AMERICAN";
N[4173]="NATIVE AMERICAN";
N[4172]="PACIFIC RIM";
N[1208]="EUROPEAN";
N[357]="FOLK ART";
N[1209]="FURNITURE";
N[2205]="GLASS";
N[1210]="MEDICAL";
N[1211]="METALWARE";
N[358]="GENERAL";
N[4175]="BRASS";
N[1212]="BRONZE";
N[1213]="COPPER";
N[4176]="GOLD";
N[1214]="PEWTER";
N[1215]="SILVER";
N[1216]="SILVER PLATE";
```

*FIG. 8A*

```
N[359]="MUSICAL INSTRUMENTS";
N[1217]="PRIMITIVES";
N[360]="PRINTS";
N[4300]="REPRODUCTIONS";
N[361]="SCIENCE INSTRUMENTS";
N[2218]="TEXTILES, LINENS";
N[362]="GENERAL";
N[2222]="FABRIC";
N[2219]="LACE,CROCHET,DOILIES";
N[2220]="LINENS";
N[2221]="QUILTS";
N[2225]="RUGS";
N[2223]="SAMPLERS";
N[2224]="TAPESTRY";
N[1218]="TOLEWARE";
N[1219]="WOODENWARE";
N[1220]="ANTIQUES (POST-1900)";
N[364]="GENERAL";
N[1221]="FURNITURE";
N[266]="BOOKS, MOVIES, MUSIC";
N[267]="BOOKS";
N[268]="GENERAL";
N[1092]="AUDIO";
N[1093]="CHILDREN";
N[279]="GENERAL";
N[2226]="ANTIQUE";
N[1094]="BIG LITTLE BOOKS";
N[1095]="CLASSICS";
N[1096]="EARLY READERS";
N[1097]="FAIRY TALES";
N[2227]="FANTASY";
N[1099]="LITTLE GOLDEN BOOKS";
N[1100]="MYSTERY, ADVENTURE";
N[1101]="MYTHOLOGY";
N[1098]="NON-FICTION";
N[1102]="PICTURE BOOKS";
N[1103]="SERIES";
N[1104]="YOUNG ADULT";
N[1105]="EDUCATIONAL";
N[2228]="GENERAL";
N[1106]="BUSINESS, FINANCE";
N[1107]="COMPUTERS, INTERNET";
N[1108]="ENCYCLOPEDIAS";
N[1109]="HOMESCHOOL";
N[1110]="LANGUAGE";
N[1111]="MEDICAL";
N[1112]="PHYSICAL SCIENCES";
N[1113]="REFERENCE";
N[1114]="SCIENCE/TECHNOLOGY";
N[1115]="SELF-HELP";
N[2026]="TEXTBOOKS";
N[270]="FICTION";
N[377]="GENERAL";
N[271]="ADVENTURE";
N[2229]="FANTASY";
N[1116]="HORROR";
N[1117]="HUMOR";
N[1118]="MILITARY";
N[272]="MYSTERY";
N[2230]="POETRY";
N[325]="ROMANCE";
N[273]="SCI-FI";
N[1119]="WESTERN";
N[2231]="FIRST EDITIONS";
N[1120]="GENERAL";
N[2232]="SIGNED";
N[2233]="LARGE PRINT";
N[274]="NON-FICTION";
N[378]="GENERAL";
N[1121]="ARTS, ENTERTAINMENT";
N[277]="AUTO/BIOGRAPHY";
N[278]="COLLECTIBLES";
N[276]="COOKING";
N[2234]="ENTERTAINMENT";
N[1122]="GEOGRAPHY";
N[1123]="HISTORY";
N[1124]="HOBBY, CRAFTS";
N[1125]="HOME & GARDEN";
N[1126]="HUNTING, FISHING";
N[2235]="INSTRUCTIONAL";
N[1127]="MILITARY";
N[2236]="NATURE";
N[2237]="NAUTICAL";
N[1128]="PARANORMAL";
N[1129]="POETRY";
N[1130]="PRICE GUIDES";
N[2238]="PROFESSIONS";
N[1131]="RELIGION";
N[2239]="SPORTS";
N[275]="TRAVEL";
N[2240]="TRUE CRIME";
N[1132]="VEHICLES";
```

*FIG. 8B*

N[1133]="WESTERN";
N[1135]="PAPERBACKS";
N[1134]="PULPS, CLUB EDITIONS";
N[269]="RARE";
N[1136]="SCHOOL ANNUALS";
N[607]="MAGAZINES";
N[280]="GENERAL";
N[608]="ANIMAL";
N[1137]="BUSINESS";
N[2241]="CAR";
N[616]="CATALOGUE";
N[2242]="CELEBRITY";
N[609]="CHILDREN";
N[1138]="COLLECTOR";
N[2243]="COMPUTER";
N[1139]="COOKING";
N[1140]="CRAFTS, HOBBY";
N[1141]="HOME & GARDEN";
N[1142]="HORROR, MONSTER";
N[1143]="HUMOR";
N[610]="ILLUSTRATED";
N[2244]="INSTRUCTIONAL";
N[1144]="MEDICAL";
N[611]="MEN";
N[1145]="MOVIE,TV";
N[2245]="MUSIC";
N[2246]="NATIONAL GEOGRAPHIC";
N[612]="NEWS";
N[1146]="PULP";
N[1147]="SCIENCE & NATURE";
N[1148]="SCI-FI";
N[614]="SPORTING";
N[1149]="TECHNICAL";
N[1150]="TRAVEL";
N[1160]="TRUE CRIME";
N[615]="WOMEN";
N[380]="MOVIES";
N[1151]="VIDEOS";
N[309]="GENERAL";
N[1161]="ACTION, ADVENTURE";
N[2274]="ANIMATION";
N[1162]="CARTOONS";
N[1163]="CHILDRENS";
N[1164]="CLASSICS";
N[1165]="COMEDY";
N[1166]="DOCUMENTARY";

N[2275]="DRAMA";
N[2276]="EXERCISE";
N[2277]="FANTASY";
N[1470]="FOREIGN";
N[1471]="HORROR";
N[4180]="INDEPENDENT FILMS";
N[2278]="INSTRUCTIONAL";
N[2279]="MARTIAL ARTS";
N[1472]="MUSIC";
N[2280]="MUSICALS";
N[1473]="MYSTERY";
N[1474]="ROMANCE";
N[1475]="SCI FI";
N[2282]="SCIENCE/NATURE";
N[2281]="SPORTS";
N[2283]="SUPER HERO";
N[2284]="WAR";
N[2285]="WESTERNS";
N[2286]="BETA";
N[2287]="CED";
N[2288]="DVD";
N[617]="GENERAL";
N[2289]="ACTION, ADVENTURE";
N[2290]="ANIMATION";
N[2291]="CARTOONS";
N[2292]="CHILDRENS";
N[2293]="CLASSICS";
N[2294]="COMEDY";
N[2295]="DOCUMENTARY";
N[2296]="DRAMA";
N[2297]="EXERCISE";
N[2298]="FANTASY";
N[4179]="FOREIGN";
N[2299]="HORROR";
N[2301]="INDEPENDENT FILMS";
N[2300]="INSTRUCTIONAL";
N[2302]="MARTIAL ARTS";
N[2303]="MUSIC";
N[2304]="MUSICALS";
N[2305]="MYSTERY";
N[2306]="ROMANCE";
N[2307]="SCI FI";
N[2308]="SPORTS";
N[2309]="SUPER HERO";
N[2310]="WAR";
N[4178]="WESTERNS";

*FIG. 8C*

```
N[1508]="PAL";
N[4340]="PAL: SUBCATEGORIES";
N[4341]="ACTION, ADVENTURE";
N[4345]="CLASSICS";
N[4346]="COMEDY";
N[4348]="DRAMA";
N[4352]="HORROR/MYSTERY";
N[1477]="16MM";
N[1478]="35MM";
N[1476]="8MM";
N[381]="LASERDISCS";
N[304]="MUSIC";
N[305]="GENERAL";
N[1049]="CDS";
N[307]="GENERAL";
N[2027]="BIG BAND/SWING";
N[1559]="BLUES";
N[1050]="CHILDRENS";
N[2247]="CHRISTIAN";
N[1051]="CLASSICAL";
N[1560]="COMEDY";
N[1052]="COUNTRY";
N[1561]="DANCE";
N[1562]="DISCO";
N[2248]="DOO WOP";
N[1053]="FOLK";
N[3362]="GARAGE";
N[1563]="HOLIDAY";
N[2249]="HOUSE";
N[2250]="INDIE/BRIT POP";
N[1564]="INSTRUMENTAL";
N[1056]="JAZZ";
N[1565]="LATIN";
N[1566]="NEW AGE";
N[1567]="NEW ARTISTS";
N[2251]="OLD TIME RADIO";
N[1568]="OPERA";
N[1057]="POP";
N[2252]="PUNK, NEW WAVE";
N[1570]="R&B/SOUL";
N[2253]="RAG";
N[1569]="RAP/HIP-HOP";
N[1571]="REGGAE/SKA";
N[1054]="RELIGIOUS";
N[1572]="ROCK: ALTERNATIVE";
N[1573]="ROCK: CLASSIC";

N[1055]="ROCK: HARD";
N[1574]="ROCK: HEAVY METAL";
N[1575]="ROCK: SOFT";
N[1058]="SOUND TRACKS: FILM";
N[1576]="SOUND TRACKS:THEATRE";
N[2254]="SPOKEN WORD";
N[1577]="TECHNO/INDUSTRIAL";
N[1578]="VOCALS";
N[1579]="WORLD/INTERNATIONAL";
N[1071]="RECORDS";
N[306]="GENERAL";
N[2265]="45 RPM";
N[2266]="78 RPM";
N[2028]="BIG BAND/SWING";
N[1580]="BLUES";
N[1072]="CHILDRENS";
N[2255]="CHRISTIAN";
N[1073]="CLASSICAL";
N[2256]="COLOR VINYL";
N[2257]="COMEDY";
N[1074]="COUNTRY";
N[1581]="DANCE";
N[1582]="DISCO";
N[2258]="DOO WOP";
N[1075]="FOLK";
N[3366]="GARAGE";
N[1583]="HOLIDAY";
N[2259]="HOUSE";
N[2260]="INDIE/BRIT POP";
N[1584]="INSTRUMENTAL";
N[1078]="JAZZ";
N[1585]="LATIN";
N[1586]="NEW AGE";
N[1587]="NEW ARTISTS";
N[2261]="OLD TIME RADIO";
N[1588]="OPERA";
N[1079]="PICTURE";
N[1080]="POP";
N[2262]="PUNK, NEW WAVE";
N[1590]="R&B/SOUL";
N[2263]="RAG";
N[1589]="RAP/HIP-HOP";
N[1591]="REGGAE/SKA";
N[1076]="RELIGIOUS";
N[1592]="ROCK: ALTERNATIVE";
N[1593]="ROCK: CLASSIC";
```

*FIG. 8D*

```
N[1077]="ROCK: HARD";
N[1594]="ROCK: HEAVY METAL";
N[1595]="ROCK: SOFT";
N[1081]="SOUND TRACKS: FILM";
N[1596]="SOUND TRACKS:THEATRE";
N[2264]="SPOKEN WORD";
N[1597]="TECHNO/INDUSTRIAL";
N[1598]="VOCALS";
N[1599]="WORLD/INTERNATIONAL";
N[1603]="TAPES";
N[618]="GENERAL";
N[1601]="8 TRACKS";
N[1600]="CASSETTES";
N[2267]="KARAOKE";
N[1602]="REEL TO REEL";
N[866]="COINS & STAMPS";
N[252]="COINS";
N[3368]="AUSTRALIA";
N[3376]="COLLECTIONS, LOTS";
N[3375]="COMMEMORATIVE";
N[4478]="CURRENCY";
N[3372]="DECIMAL";
N[3369]="GOLD COINS";
N[3373]="MINT SETS";
N[3371]="PRE-DECIMAL: COPPER";
N[3370]="PRE-DECIMAL: SILVER";
N[3374]="PROOF SETS";
N[256]="NON-US";
N[257]="GENERAL";
N[532]="ANCIENT, MEDIEVAL";
N[533]="AFRICA";
N[534]="ASIA";
N[535]="AUSTRALIA";
N[536]="CANADA";
N[537]="CENTRAL AMERICA";
N[538]="ENGLAND";
N[539]="FRANCE";
N[540]="GERMANY";
N[541]="MEXICO";
N[542]="SOUTH AMERICA";
N[543]="ERRORS";
N[544]="COLLECTIONS, LOTS";
N[545]="MINT, PROOF SETS";
N[546]="COMMEMORATIVE";
N[547]="GOLD";
N[385]="CURRENCY";
N[258]="CERTIFICATES";
N[548]="PUBLICATIONS";
N[549]="SUPPLIES";
N[3394]="UK";
N[3404]="1/2 CROWN";
N[3396]="1/2 PENNY";
N[3403]="2 SHILLINGS";
N[3398]="3 PENCE";
N[3400]="4 PENCE";
N[3399]="6 PENCE";
N[3410]="COLLECTIONS, LOTS";
N[4397]="COMMEMORATIVE";
N[3406]="CROWN";
N[4477]="CURRENCY";
N[3407]="DECIMAL COINAGE";
N[3405]="DOUBLE FLORIN";
N[4398]="FARTHING";
N[3402]="FLORIN ";
N[3408]="GOLD";
N[3397]="PENNY";
N[3409]="PROOF SETS";
N[3401]="SHILLING";
N[253]="US";
N[786]="GENERAL";
N[254]="CENTS";
N[255]="CERTIFICATES";
N[525]="COLLECTIONS, LOTS";
N[528]="COLONIAL";
N[529]="COMMEMORATIVE";
N[376]="CURRENCY";
N[867]="DIMES";
N[523]="DOLLARS";
N[524]="ERRORS";
N[527]="GOLD";
N[522]="HALVES";
N[526]="MINT, PROOF SETS";
N[520]="NICKELS";
N[530]="PUBLICATIONS";
N[521]="QUARTERS";
N[531]="SUPPLIES";
N[259]="EXONUMIA";
N[260]="STAMPS";
N[261]="US";
N[262]="GENERAL";
N[675]="19TH CENTURY:USED";
N[676]="19TH CENTURY:UNUSED";
```

*FIG. 8E*

N[678]="20TH CENTURY:USED";
N[679]="20TH CENTURY:UNUSED";
N[680]="AIR MAIL";
N[681]="BACK OF BOOK";
N[682]="BLOCKS, SHEETS";
N[683]="COLLECTION, MIXTURE";
N[684]="COVERS";
N[685]="DUCK STAMPS";
N[686]="EFOS";
N[687]="FIRST DAY COVERS";
N[688]="POSSESSIONS";
N[689]="PUBLICATIONS";
N[690]="REVENUES";
N[691]="SUPPLIES";
N[265]="TOPICAL";
N[352]="WORLD";
N[264]="GENERAL";
N[692]="AFRICA";
N[693]="ASIA";
N[263]="BRITISH COMMONWEALTH";
N[694]="CENTRAL AMERICA";
N[695]="SOUTH AMERICA";
N[696]="COLLECTION, MIXTURE";
N[697]="COVERS";
N[698]="EFOS";
N[699]="EUROPE";
N[700]="FIRST DAY COVERS";
N[701]="PUBLICATIONS";
N[702]="SUPPLIES";
N[703]="TOPICAL";
N[3468]="AUSTRALIA";
N[3467]="GENERAL";
N[3469]="AUSTRALIAN STATES";
N[3470]="BOOKLETS ";
N[3471]="COLLECTION, MIXTURE";
N[3472]="COVERS";
N[3473]="FDCS";
N[3474]="FLIGHT COVERS";
N[3475]="PLATEBLOCK/MULTIPLES";
N[3476]="SHEETS ";
N[3499]="UK";
N[3498]="GENERAL";
N[3504]="BOOKLETS ";
N[3503]="COLLECTION, MIXTURE ";
N[3513]="COMMEMORATIVE";
N[3502]="COVERS";

N[3510]="EDWARD VII";
N[3507]="EDWARD VIII";
N[3506]="ELIZABETH II";
N[3501]="FDCS";
N[3509]="GEORGE V";
N[3508]="GEORGE VI";
N[3505]="PLATEBLOCK/MULTIPLES";
N[3500]="SHEETS ";
N[3511]="VICTORIA";
N[704]="PHILATELY";
N[705]="GENERAL";
N[1]="COLLECTIBLES";
N[34]="ADVERTISING";
N[35]="GENERAL";
N[805]="AIRLINES";
N[806]="GENERAL";
N[807]="AMERICAN";
N[808]="BRANIFF";
N[809]="DELTA";
N[810]="EASTERN";
N[3865]="NATIONAL AIRLINES";
N[811]="PAN AM";
N[812]="PIEDMONT";
N[813]="TWA";
N[1312]="UNITED";
N[1313]="AUTO";
N[1314]="GENERAL";
N[3872]="BRITISH/EUROPEAN";
N[1315]="BUICK";
N[1316]="CHEVROLET";
N[1317]="CHRYSLER";
N[3871]="DAIMLER/MERCEDES";
N[1318]="DODGE";
N[1319]="FORD";
N[4400]="JAGUAR";
N[3874]="PACKARD";
N[1320]="PONTIAC";
N[1321]="BAKERY";
N[871]="BUS";
N[872]="CANDY";
N[873]="GENERAL";
N[874]="M&M";
N[1322]="CEREAL";
N[796]="CHARACTER";
N[43]="CIGARETTE";
N[44]="GENERAL";

*FIG. 8F*

```
N[3880]="DUNHILL";
N[45]="JOE CAMEL";
N[814]="KOOL";
N[3879]="LUCKY STRIKE";
N[815]="MARLBORO";
N[4266]="ROTHMANS";
N[816]="WINSTON";
N[797]="CLOCKS";
N[865]="COFFEE";
N[817]="DAIRY";
N[818]="GENERAL";
N[819]="BORDENS";
N[3881]="ICE CREAM";
N[798]="DISPLAYS";
N[820]="DISTILLERY";
N[821]="GENERAL";
N[4595]="BRITISH ISLE";
N[4372]="BUNDABERG ";
N[824]="GREEN RIVER";
N[4270]="IRISH";
N[822]="JACK DANIELS";
N[823]="JIM BEAM";
N[825]="OLD CROW";
N[3882]="SCOTTISH";
N[3883]="WILD TURKEY";
N[826]="DOLLS";
N[1525]="DRUG STORE";
N[827]="FARM";
N[828]="GENERAL";
N[830]="ALLIS CHALMERS";
N[3884]="CASE";
N[831]="INTL HARVESTER";
N[829]="JOHN DEERE";
N[3885]="FASHION";
N[1526]="FOOD";
N[875]="FOREST SERVICE";
N[39]="GASOLINE";
N[40]="GENERAL";
N[3888]="BP";
N[1328]="CITGO";
N[41]="ESSO";
N[839]="EXXON";
N[1329]="GULF";
N[1330]="HESS";
N[864]="HUMBLE";
N[832]="PHILLIP 66";

N[833]="SHELL";
N[834]="MOBIL";
N[835]="PENNZOIL";
N[42]="TEXACO";
N[836]="TYDOL";
N[837]="QUAKER STATE";
N[1331]="SINCLAIR";
N[838]="STANDARD OIL";
N[1332]="SUNOCO";
N[3893]="GENERAL STORE";
N[1527]="HOUSEHOLD";
N[799]="LABELS";
N[3894]="MR. PEANUT";
N[800]="PREMIUMS";
N[845]="RADIO/PHONOGRAPH";
N[846]="GENERAL";
N[3895]="BRITISH /EUROPEAN";
N[847]="RCA";
N[848]="EDISON";
N[849]="RESTAURANT";
N[850]="GENERAL";
N[851]="BIG BOY";
N[1333]="SEED, FEED";
N[840]="SHOES";
N[841]="GENERAL";
N[842]="RED GOOSE";
N[843]="BUSTER BROWN";
N[844]="WEATHERBIRD";
N[804]="SIGNS";
N[876]="SOAP";
N[36]="SODA";
N[37]="GENERAL";
N[852]="FOUNTAIN";
N[853]="CANADA DRY";
N[38]="COCA-COLA";
N[877]="DR.PEPPER";
N[1334]="MOXIE";
N[854]="PEPSI";
N[855]="7UP";
N[3897]="SCHWEPPES";
N[856]="SQUIRT";
N[857]="HIRES ROOT BEER";
N[878]="SOUP";
N[879]="TELEPHONE";
N[801]="TINS";
N[863]="TIRES";
```

*FIG. 8G*

```
N[803]="TRAYS";
N[880]="TRUCK LINES";
N[858]="UTILITIES";
N[859]="GENERAL";
N[860]="REDDY KILOWATT";
N[861]="HANDY FLAME";
N[862]="WILLIE WIREHAND";
N[802]="VICTORIAN TRADECARDS";
N[1335]="ANIMALS";
N[1336]="GENERAL";
N[1337]="BIRD";
N[1338]="CAT";
N[3230]="DINOSAUR";
N[1339]="DOG";
N[1340]="FANTASY";
N[1528]="FARM";
N[3898]="FISH";
N[1341]="HORSE";
N[1342]="REPTILE";
N[3238]="WILDLIFE";
N[1343]="ZOO";
N[1529]="ANIMATION ART";
N[1530]="GENERAL";
N[1531]="HAND-PAINTED";
N[1532]="PRODUCTION ART";
N[1533]="SERICELS";
N[1344]="ANIMATION CHARACTERS";
N[363]="GENERAL";
N[1534]="HANNA-BARBERA";
N[1345]="JAPANESE ANIMATION";
N[1535]="KING FEATURES";
N[1536]="WALTER LANTZ";
N[1537]="WARNER BROTHERS";
N[555]="ART";
N[47]="GENERAL";
N[777]="AMATEUR ART";
N[1086]="ARTIST OFFERINGS";
N[556]="CALENDARS";
N[881]="DECORATOR/DESIGNER";
N[557]="PAINTING";
N[559]="POSTERS";
N[560]="PRINTS";
N[561]="SUPPLIES";
N[3899]="VINTAGE PIN UP";
N[550]="ART:FINE";
N[551]="PAINTINGS";
N[552]="DRAWINGS";
N[553]="SCULPTURES";
N[554]="MULTIPLE TECHNIQUES";
N[49]="AUTOGRAPHS";
N[50]="GENERAL";
N[57]="ENTERTAINMENT";
N[58]="GENERAL";
N[59]="MOVIES";
N[1346]="SPACE";
N[60]="TELEVISION";
N[61]="RECORDING ARTISTS";
N[3900]="HISTORICAL";
N[883]="POLITICAL";
N[3901]="SCIENCE";
N[62]="SCI-FI";
N[884]="BANKS";
N[149]="GENERAL";
N[885]="MECHANICAL";
N[886]="STILL";
N[887]="BARBER SHOP, SHAVING";
N[3265]="BARWARE";
N[3269]="GENERAL";
N[3273]="SHOTGLASSES";
N[386]="BEARS";
N[117]="GENERAL";
N[387]="ACCESSORIES";
N[31]="ANTIQUE";
N[3902]="ARTIST";
N[389]="GENERAL";
N[3904]="ARTIST OFFERINGS";
N[3903]="MANUFACTURED";
N[1347]="BOYDS";
N[390]="GENERAL";
N[3905]="CURRENT";
N[1348]="RESIN";
N[3877]="RETIRED,DISCONTIUED";
N[1538]="CHAD VALLEY";
N[3906]="CHERISHED TEDDIES";
N[391]="GENERAL";
N[3907]="CURRENT";
N[3908]="RESIN";
N[3909]="RETIRED";
N[1539]="DEANS";
N[1540]="MERRYTHOUGHT";
N[392]="MUFFY";
N[779]="RAIKES";
```

*FIG. 8H*

```
N[3910]="STEIFF";
N[393]="GENERAL";
N[3911]="CURRENT";
N[3912]="VINTAGE";
N[394]="BLACK AMERICANA";
N[889]="BOTTLES";
N[369]="GENERAL";
N[1349]="AVON";
N[890]="BITTERS";
N[891]="FLASKS";
N[892]="FRUIT JARS";
N[893]="HOUSEHOLD";
N[894]="INKS";
N[895]="MEDICINE AND CURES";
N[896]="MINERAL";
N[3914]="MINIATURES";
N[897]="POISONS";
N[1350]="SODA";
N[1351]="WHISKEY";
N[562]="BREWERIANA";
N[118]="GENERAL";
N[563]="BOTTLES";
N[3915]="CANS";
N[564]="GENERAL";
N[3916]="CONE TOPS";
N[3917]="FLAT TOPS";
N[3918]="PULL TABS";
N[3919]="WORLD";
N[565]="COASTERS";
N[566]="OPENERS, CORKSCREWS";
N[567]="PAPER, LABELS";
N[568]="PRE-PROHIBITION";
N[569]="SIGNS, TINS";
N[3920]="STEINS, DRINKWARE";
N[570]="GENERAL";
N[3921]="GLASSES";
N[3922]="LIDDED STEINS";
N[3923]="MUGS";
N[3924]="PITCHERS";
N[3925]="STEINS";
N[571]="TAP HANDLES, KNOBS";
N[572]="TRAYS";
N[388]="BREYER";
N[898]="CASINO";
N[573]="GENERAL";
N[899]="CHIPS";
N[3443]="STRIKES";
N[3512]="TOKENS";
N[791]="CHALKWARE";
N[2016]="CIRCUS, CARNIVAL";
N[2017]="GENERAL";
N[3926]="FAIRGROUND ART";
N[3927]="FAIRINGS";
N[1541]="FAIRS";
N[2018]="PROGRAMS AND POSTERS";
N[2019]="SOUVENIRS";
N[397]="CLOCKS, TIMEPIECES";
N[3932]="CHARACTER WATCHES";
N[1352]="GENERAL";
N[3933]="CLOCKS";
N[3934]="POCKET WATCHES";
N[3935]="WATCHES";
N[3928]="CLOCKS";
N[119]="GENERAL";
N[3929]="ANTIQUES";
N[3930]="CONTEMPORARY";
N[3931]="VINTAGE";
N[401]="MISCELLANEOUS";
N[3937]="POCKET WATCHES";
N[398]="GENERAL";
N[3940]="ANTIQUES";
N[3938]="CONTEMPORARY";
N[3939]="VINTAGE ";
N[3941]="WRIST WATCHES";
N[399]="GENERAL";
N[3942]="CONTEMPORARY";
N[4189]="SWATCH";
N[3943]="VINTAGE";
N[400]="OTHER TIMEPIECES";
N[3944]="COIN - OPERATED";
N[575]="GENERAL";
N[3945]="ARCADE";
N[3946]="JUKEBOXES";
N[3947]="PINBALL";
N[3948]="SLOTS";
N[3949]="TRADE STIMULATORS";
N[3950]="VENDING";
N[1353]="COLLECTOR PLATES";
N[574]="GENERAL";
N[3951]="BING AND GRONDAHL";
N[1354]="BRADFORD EXCHANGE";
N[1355]="DANBURY MINT";
```

FIG. 81

```
N[1356]="FRANKLIN MINT";
N[1357]="HAMILTON";
N[1358]="KNOWLES";
N[1359]="PRINCESS HOUSE";
N[1360]="STATE PLATES";
N[1361]="WEDGWOOD";
N[63]="COMIC BOOKS";
N[78]="COMIC MAGAZINES";
N[64]="GENERAL";
N[72]="CLASSIC";
N[3952]="COLLECTIONS ";
N[80]="COMIC FIGURINES";
N[3965]="COMIC MAGAZINES";
N[3752]="GENERAL";
N[3966]="ALTERNATIVE, ZINES";
N[3967]="FAN CLUBS";
N[3968]="HEAVY METAL";
N[3969]="MAD";
N[3970]="PULPS";
N[3971]="SUPERHERO ";
N[3953]="FULL RUNS";
N[66]="GOLDEN AGE";
N[67]="GENERAL";
N[3972]="CARTOON CHARACTER";
N[69]="CRIME";
N[71]="FUNNY ANIMAL";
N[70]="HORROR/SCI-FI";
N[3973]="ROMANCE";
N[68]="SUPERHERO";
N[3974]="WAR";
N[3975]="WESTERNS";
N[3954]="GRAPHIC NOVELS";
N[3957]="INTERNATIONAL";
N[3956]="GENERAL";
N[3960]="FRANCE";
N[3962]="JAPAN";
N[3964]="UK";
N[900]="MODERN";
N[77]="GENERAL";
N[901]="1970-1980";
N[902]="1981-1990";
N[903]="1991-NOW";
N[3979]="ALTERNATIVE";
N[3980]="CARTOON CHARACTER";
N[3981]="HORROR/SCI-FI";
N[3982]="REPRINTS";
N[3983]="SUPERHERO";
N[3955]="MOVIE, TV";
N[79]="NEWSPAPER COMICS";
N[3984]="ORIGINAL COMIC ART";
N[972]="GENERAL";
N[3985]="COVERS";
N[3986]="DRAWINGS, SKETCHES";
N[3987]="PAINTINGS";
N[65]="PRE-GOLDEN AGE";
N[3989]="PUBLISHERS";
N[3988]="GENERAL";
N[3990]="ARCHIE ";
N[3991]="DARK HORSE";
N[3992]="DC ";
N[3993]="DELL";
N[3994]="GOLD KEY";
N[3995]="HARVEY ";
N[3996]="IMAGE ";
N[3997]="MARVEL";
N[3998]="VERTIGO";
N[3999]="VIZ";
N[73]="SILVER AGE";
N[74]="GENERAL";
N[3976]="CARTOON CHARACTER";
N[76]="HORROR/SCI-FI";
N[3977]="ROMANCE";
N[75]="SUPERHERO";
N[3978]="WESTERNS";
N[109]="CONTEMPORARY";
N[120]="CRAFTS";
N[121]="GENERAL";
N[953]="CROSS STITCH";
N[954]="CROCHET";
N[1087]="HANDCRAFTED ARTS";
N[122]="GENERAL";
N[1088]="ARTIST OFFERINGS";
N[1362]="KNITTING";
N[1363]="NEEDLEPOINT";
N[904]="SUPPLIES";
N[123]="GENERAL";
N[905]="STAMPING";
N[906]="PATTERNS";
N[1364]="TOLE PAINTING";
N[98]="DECORATIVE";
N[100]="GENERAL";
N[4018]="ANRI";
```

*FIG. 8J*

```
N[4019]="ARMANI";
N[97]="AVON WORKS";
N[4020]="BELLS";
N[4021]="BYERS CHOICE";
N[4022]="CAT'S MEOW VILLAGE";
N[4023]="CLOISONNE";
N[1543]="DAVID WINTER";
N[4024]="DUNCAN ROYALE";
N[4025]="EGGS";
N[104]="ENESCO";
N[4026]="FLAMBRO";
N[1545]="HARMONY KINGDOM";
N[103]="HUMMEL";
N[105]="JOSEF";
N[1544]="LILLIPUT LANE";
N[101]="LONGABERGER";
N[108]="NORMAN ROCKWELL";
N[107]="PRECIOUS MOMENTS";
N[1546]="ROBERT HARROP";
N[4027]="ROYAL DOULTON";
N[4028]="SCHMID";
N[4029]="SEASHELLS";
N[4030]="TOM CLARK";
N[106]="WADE";
N[4031]="WEDGWOOD";
N[1542]="WORLD STUDIOS";
N[1365]="DEPT 56";
N[370]="GENERAL";
N[4032]="ALPINE VILLAGE";
N[4033]="CHRISTMAS IN CITY";
N[1366]="DICKENS VILLAGE";
N[1547]="HERITAGE VILLAGE";
N[4034]="NEW ENGLAND VILLAGE";
N[4035]="NORTH POLE";
N[1367]="SNOW BABIES";
N[1368]="SNOW VILLAGE";
N[137]="DISNEYANA";
N[1369]="CONTEMPORARY";
N[138]="GENERAL";
N[1370]="APPAREL,ACCESSORIES";
N[1371]="ANIMATION/CELS";
N[144]="POSTERS, LITHOS";
N[1372]="BOOKS";
N[1373]="COLLECTOR CLUBS";
N[1374]="COMICS";
N[141]="FIGURES";
N[1375]="FIGURINES";
N[1376]="HOLIDAY";
N[1377]="HOUSEWARES";
N[1378]="JEWELRY";
N[1379]="LIMITED EDITIONS";
N[1380]="MAGIC KINGDOMS";
N[142]="PLUSH TOYS";
N[143]="PINS, BUTTONS";
N[1381]="PREMIUMS";
N[1382]="RECORDS/TAPES/CD'S";
N[1383]="TOYS,GAMES,PUZZLES";
N[145]="VIDEO/LASERDISCS";
N[1384]="WATCHES";
N[139]="VINTAGE";
N[140]="GENERAL";
N[1385]="APPAREL/ACCESSORIES";
N[1386]="ANIMATION,CELS";
N[1387]="POSTERS & LITHOS";
N[1388]="BOOKS";
N[1389]="COMICS";
N[1390]="FIGURES";
N[1391]="FIGURINES";
N[1392]="HOLIDAY";
N[1152]="HOUSEWARES";
N[1393]="JEWELRY";
N[1394]="PINS, BUTTONS";
N[1395]="PLUSH TOYS";
N[1396]="PREMIUMS";
N[1397]="RECORDS";
N[1398]="TOYS,GAMES,PUZZLES";
N[1399]="WATCHES";
N[4036]="EDUCATIONAL";
N[4037]="ELECTRIC FANS";
N[128]="ETHNOGRAPHIC";
N[4038]="FIREFIGHTING";
N[396]="GENERAL";
N[4039]="EXTINGUISHERS";
N[4040]="HELMETS";
N[4041]="PATCHES";
N[792]="FISHING";
N[793]="GENERAL";
N[794]="LURES";
N[4042]="FLAGS";
N[4043]="FLUE COVERS";
N[3547]="FOLK ART";
N[402]="FRATERNAL GROUPS";
```

*FIG. 8K*

```
N[403]="GENERAL";
N[404]="BOY SCOUTS";
N[1548]="BOYS & GIRLS BRIGADE";
N[4044]="EMPLOYEE BADGES";
N[405]="GIRL SCOUTS";
N[518]="MASONIC";
N[1549]="SALVATION ARMY";
N[1550]="TRADE UNION";
N[1400]="FURNITURE";
N[576]="HALLMARK";
N[147]="GENERAL";
N[973]="KIDDIE CAR CLASSICS";
N[577]="MERRY MINIATURES";
N[578]="MINIATURE ORNAMENTS";
N[579]="SERIES ORNAMENTS";
N[2000]="HAWAIIANA";
N[2001]="GENERAL";
N[2002]="ACCESSORIES";
N[2003]="APPAREL";
N[2004]="HULA";
N[907]="HOLIDAY, SEASONAL";
N[365]="GENERAL";
N[1089]="CHRISTMAS";
N[908]="GENERAL";
N[148]="ORNAMENTS";
N[1090]="SANTA";
N[1091]="VINTAGE";
N[909]="EASTER";
N[910]="HALLOWEEN";
N[4045]="MARDI GRAS";
N[911]="NEW YEAR";
N[912]="THANKSGIVING";
N[913]="VALENTINE";
N[795]="INSULATORS";
N[3628]="KEYCHAINS";
N[81]="KITCHENWARE";
N[82]="GENERAL";
N[4046]="COOKIE CUTTERS";
N[4047]="COOKIE JARS";
N[83]="GENERAL";
N[4048]="TOPS , BOTTOMS";
N[974]="COOKWARE";
N[975]="GENERAL";
N[976]="CAST IRON";
N[977]="GRANITEWARE";
N[580]="OPEN SALTS";
N[4049]="SALT, PEPPER SHAKERS";
N[84]="GENERAL";
N[4051]="SINGLES";
N[4050]="SOUVENIR";
N[982]="SMALL APPLIANCES";
N[978]="TABLEWARE";
N[979]="GENERAL";
N[980]="FLATWARE";
N[981]="HOLLOW WARE";
N[983]="UTENSILS";
N[1401]="KNIVES";
N[475]="GENERAL";
N[1402]="COMMEMORATIVE";
N[1403]="POCKET";
N[1404]="LAMPS";
N[371]="GENERAL";
N[4062]="CANDLE HOLDERS";
N[4053]="ELECTRIC";
N[1405]="GENERAL";
N[4052]="LAVA LAMPS";
N[4054]="MOTION";
N[4055]="NEON";
N[4056]="POTTERY";
N[4057]="NON ELECTRIC";
N[1406]="GENERAL";
N[4058]="GAS";
N[4059]="KEROSENE";
N[4060]="MINIATURE";
N[4061]="OIL";
N[1407]="PARTS";
N[1408]="SHADES";
N[581]="LIMITED EDITIONS";
N[3557]="LOCKS, KEYS";
N[1409]="LUNCHBOXES";
N[150]="GENERAL";
N[1410]="METAL";
N[1411]="PLASTIC";
N[476]="MAGNETS";
N[1412]="MAPS / ATLAS";
N[582]="GENERAL";
N[1413]="ROAD MAPS";
N[4065]="MEDICAL";
N[4064]="GENERAL";
N[4066]="DENTAL";
N[4067]="DEVICES";
N[4068]="PAPER";
```

FIG. 8L

```
N[4069]="QUACK";
N[195]="MEMORABILIA";
N[3629]="GENERAL";
N[208]="HISTORICAL";
N[427]="MAGIC";
N[196]="MOVIE";
N[197]="GENERAL";
N[4263]="BRITISH COMEDY";
N[2025]="GONE WITH THE WIND";
N[2316]="JAMES BOND";
N[198]="LOBBY CARDS:GENERAL";
N[1417]="LOBBY CARDS:NON-US";
N[1419]="POSTERS:GENERAL";
N[1420]="POSTERS:NON-US";
N[790]="PROPS, WARDROBE";
N[199]="LITHOGRAPHS";
N[200]="PHOTOS";
N[211]="OTHER";
N[431]="ROCK-N-ROLL";
N[210]="GENERAL";
N[1421]="PHOTOS";
N[1422]="HARD ROCK CAFE";
N[432]="THE BEATLES";
N[433]="ELVIS:GENERAL";
N[2007]="ELVIS:BUTTONS";
N[2008]="ELVIS:CLOTHING";
N[2009]="ELVIS:CONCERT/TOUR";
N[2010]="ELVIS:BELONGINGS";
N[2011]="ELVIS:MOVIE ITEMS";
N[2012]="ELVIS:MUSIC";
N[2013]="ELVIS:NOVELTIES";
N[2014]="ELVIS:PHOTOS";
N[2015]="ELVIS:TRADING CARDS";
N[447]="GRATEFUL DEAD";
N[434]="KISS";
N[435]="MICHAEL JACKSON";
N[2354]="PINK FLOYD";
N[2355]="QUEEN";
N[445]="ROLLING STONES";
N[1423]="THE WHO";
N[2356]="U2";
N[1414]="ROYAL";
N[1424]="TELEVISION";
N[201]="GENERAL";
N[1425]="50'S";
N[1426]="60'S";
N[1427]="70'S";
N[1428]="80'S";
N[1429]="90'S";
N[778]="THEATRE";
N[209]="WESTERN";
N[1430]="METALWARE";
N[28]="GENERAL";
N[1431]="ALUMINUM";
N[3630]="BRASS";
N[1432]="BRONZE";
N[3631]="CAST IRON";
N[1433]="COPPER";
N[1434]="PEWTER";
N[1435]="SILVER";
N[1436]="SILVER PLATE";
N[134]="MILITARIA";
N[135]="GENERAL";
N[4070]="PRE CIVIL WAR";
N[583]="PRE WW I";
N[585]="WW II";
N[1552]="ANCIENT";
N[136]="CIVIL WAR";
N[587]="VIETNAM";
N[584]="WW I";
N[586]="KOREA";
N[588]="SURPLUS";
N[4072]="MILITARIA: WORLD";
N[4071]="GENERAL";
N[4373]="AUSTRALIAN";
N[4073]="GENERAL";
N[4374]="WW I";
N[4375]="WW II";
N[4074]="BRITISH";
N[4075]="CANADIAN";
N[4076]="CHINESE";
N[4077]="FRENCH";
N[4078]="GERMAN";
N[4079]="ITALIAN";
N[4080]="JAPANESE";
N[4081]="SWEDISH";
N[4082]="MILLENNIUM";
N[3632]="MINING";
N[984]="MUSIC BOXES";
N[713]="NATIVE AMERICANA";
N[372]="GENERAL";
N[714]="ARTS, CRAFTS";
```

*FIG. 8M*

N[715]="ARTIFACTS";
N[716]="PRE-1940";
N[4083]="NODDERS";
N[4085]="OPTICAL";
N[4084]="GENERAL";
N[4086]="EYEGLASSES";
N[4087]="SURVEYING EQUIPMENT";
N[3636]="TELESCOPES";
N[373]="ORIENTALIA";
N[124]="PAPER";
N[125]="GENERAL";
N[4089]="BLOTTERS";
N[4090]="BOOKLETS";
N[4091]="BROCHURES";
N[4092]="DOCUMENTS";
N[126]="EPHEMERA";
N[3633]="GREETING CARDS";
N[477]="MATCHBOOKS";
N[1437]="MENUS";
N[1439]="NEWSPAPERS";
N[1438]="PLAYING CARDS";
N[914]="POSTCARDS";
N[127]="GENERAL";
N[3634]="ADVERTISING";
N[915]="ANIMALS";
N[916]="ARTIST SIGNED";
N[4093]="COMIC";
N[917]="ETHNIC";
N[918]="EXPOSITION";
N[919]="GREETINGS";
N[920]="HOLIDAY";
N[921]="MILITARY";
N[4095]="NATIONAL PARKS";
N[3635]="PATRIOTIC";
N[922]="REAL PHOTO";
N[4094]="SPORTS";
N[924]="STATE VIEWS";
N[925]="TOWN VIEWS";
N[926]="TRANSPORTATION";
N[927]="WESTERN";
N[4096]="WORLD";
N[1440]="SCRAPBOOKS";
N[4097]="PEZ";
N[151]="GENERAL";
N[4098]="CURRENT";
N[4099]="VINTAGE (NO FEET)";

N[1442]="PHONOGRAPHS";
N[407]="PHOTOGRAPHIC IMAGES";
N[48]="GENERAL";
N[408]="DAGUERREO/AMBRO/TIN";
N[409]="CDV/CABINET";
N[1507]="RISQUE";
N[410]="STEREOVIEW";
N[411]="VIEWMASTER";
N[2036]="PINBACKS";
N[928]="POLICE";
N[395]="GENERAL";
N[930]="PATCHES";[929]="OBSOLETE BADGES";
N[4100]="POLITICAL: US";
N[367]="GENERAL";
N[4101]="CITY";
N[4102]="CONGRESS";
N[4104]="COUNTY";
N[4103]="PRESIDENT";
N[4105]="SENATE";
N[4106]="STATE";
N[4108]="POLITICAL: WORLD";
N[4107]="GENERAL";
N[4109]="AUSTRALIA";
N[4110]="FRANCE";
N[4113]="JAPAN";
N[4112]="LATIN AMERICA";
N[4111]="SWEDEN";
N[4114]="UK";
N[1443]="PROMO GLASSES";
N[931]="RADIO";
N[132]="GENERAL";
N[932]="TRANSISTOR";
N[933]="TUBE";
N[934]="MANUALS";
N[1446]="RELIGIOUS";
N[366]="GENERAL";
N[1447]="CHRISTIANITY";
N[1448]="EASTERN";
N[4280]="ISLAM";
N[1449]="JUDAISM";
N[4115]="SCALES";
N[412]="SCIENCE";
N[413]="GENERAL";
N[414]="INSTRUMENTS";
N[415]="ROCK/FOSSIL/MINERAL";
N[416]="SPACE EXPLORATION";

*FIG. 8N*

```
N[152]="SCIENCE FICTION";
N[153]="GENERAL";
N[785]="BABYLON 5";
N[1450]="DR. WHO";
N[591]="GODZILLA";
N[154]="STAR WARS";
N[155]="STAR TREK";
N[156]="X FILES";
N[1451]="SHEET MUSIC";
N[157]="GENERAL";
N[1452]="MILITARY/HISTORICAL";
N[1453]="MOVIES/TV";
N[1454]="NON-PIANO";
N[1455]="RADIO";
N[1456]="RAG";
N[1457]="SONG BOOKS";
N[1458]="THEATRE";
N[1459]="TRANSPORTATION";
N[3637]="SNOWDOMES";
N[1460]="SOUVENIRS";
N[592]="STONEWARE";
N[985]="TELEPHONE";
N[3638]="TELEVISION SETS";
N[940]="TEXTILES";
N[33]="GENERAL";
N[941]="BEDSPREADS";
N[942]="DRAPERY";
N[943]="FABRIC";
N[4116]="HANDKERCHIEFS";
N[944]="KITCHEN";
N[945]="LACE,CROCHET,DOILIES";
N[946]="LINENS";
N[947]="QUILTS";
N[948]="RUGS";
N[949]="SAMPLERS";
N[3639]="TABLECLOTHS";
N[950]="TAPESTRY";
N[593]="TOBACCIANA";
N[133]="GENERAL";
N[594]="ASHTRAYS";
N[986]="CIGAR";
N[951]="LIGHTERS";
N[595]="GENERAL";
N[952]="ZIPPO";
N[4117]="MATCH HOLDERS";
N[4118]="PIPES";

N[596]="GENERAL";
N[4119]="ESTATE";
N[4120]="TOBACCO CARDS";
N[4121]="TOOLS";
N[1461]="GENERAL";
N[4122]="MECHANICS";
N[4123]="WOODWORKING";
N[868]="TRADING CARDS";
N[668]="COMIC";
N[1462]="CREDIT/CHARGE CARDS";
N[478]="GAMING";
N[218]="MAGIC";
N[219]="OTHER NON-SPORTS";
N[1463]="PHONE CARDS";
N[669]="SCIENCE FICTION";
N[3737]="GENERAL";
N[670]="BABYLON 5";
N[671]="STAR TREK";
N[672]="STAR WARS";
N[673]="X FILES";
N[479]="TRAINS, RR MODELS";
N[131]="GENERAL";
N[480]="AMERICAN FLYER";
N[1556]="HORNBY";
N[4283]="KITS";
N[4282]="GENERAL";
N[4144]="LIONEL";
N[481]="GENERAL";
N[4145]="1901-1942";
N[4146]="1945 TO 1969";
N[4147]="1970 TO 1986";
N[4148]="1987 TO CURRENT";
N[1557]="MARKLIN";
N[1558]="MARX";
N[482]="OTHER TINPLATES";
N[483]="SCALES";
N[4149]="G";
N[484]="HO, OO, TT";
N[486]="N, Z";
N[485]="O";
N[487]="OTHER";
N[1444]="TRAINS,RAILROADIANA";
N[130]="GENERAL";
N[4125]="HARDWARE";
N[4124]="GENERAL";
N[4126]="BADGES, EMBLEMS";
```

*FIG. 80*

N[4127]="DINING ITEMS";
N[4128]="LANTERNS, LAMPS";
N[4129]="LOCKS, KEYS";
N[4130]="TOOLS";
N[4131]="PAPER";
N[1445]="GENERAL";
N[4132]="BOOKS";
N[4133]="BROCHURES";
N[4134]="EMPLOYEE TIMETABLES ";
N[4135]="PASSES, TICKETS";
N[4136]="PUBLIC TIMETABLES";
N[4137]="RULE BOOKS";
N[417]="TRANSPORTATION";
N[4150]="GENERAL";
N[418]="AUTOMOBILIA";
N[419]="AVIATION";
N[420]="BICYCLE";
N[4151]="BUS";
N[421]="LICENSE PLATES";
N[423]="NAUTICAL";
N[4152]="SUBWAY";
N[1464]="UMBRELLAS";
N[597]="VANITY ITEMS";
N[598]="GENERAL";
N[599]="ACCESSORIES";
N[4153]="CELLULOID";
N[600]="COMPACTS";
N[601]="HATPINS";
N[602]="PERFUMES";
N[4155]="VICTORIAN SETS";
N[110]="VINTAGE";
N[111]="GENERAL";
N[956]="CLOTHING";
N[112]="GENERAL";
N[957]="ACCESSORIES";
N[958]="CHILDREN";
N[4156]="COSTUMES / MASKS";
N[959]="DENIM";
N[960]="HATS";
N[961]="MEN";
N[962]="PURSES";
N[963]="SHOES";
N[964]="SPORTS";
N[965]="WOMEN";
N[113]="VINTAGE SEWING";
N[114]="GENERAL";

N[115]="BUTTONS";
N[605]="MACHINE, ACCESSORY";
N[4157]="PATTERNS";
N[606]="GENERAL";
N[4159]="ACCESSORIES";
N[4158]="CHILDREN";
N[4160]="MEN";
N[4161]="WOMEN";
N[1465]="PIN CUSHIONS";
N[116]="THIMBLES";
N[1466]="WEIRD STUFF";
N[515]="GENERAL";
N[1467]="SLIGHTLY UNUSUAL";
N[1468]="REALLY WEIRD";
N[1469]="TOTALLY BIZARRE";
N[987]="WESTERN AMERICANA";
N[4162]="WORLDS FAIR";
N[426]="GENERAL";[4163]="1876 PHILADELPHIA";
N[4164]="1893 CHICAGO";
N[4165]="1901 BUFFALO";
N[4166]="1904 ST LOUIS";
N[4167]="1933-4 CHICAGO";
N[4168]="1939-40 NEW YORK";
N[4169]="1964-5 NEW YORK";
N[966]="WRITING INSTRUMENTS";
N[158]="GENERAL";
N[967]="PENS";
N[968]="PENCILS";
N[969]="DESKTOP ITEMS";
N[970]="INKWELLS";
N[971]="SETS";
N[159]="MISCELLANEOUS";
N[160]="COMPUTERS";
N[1085]="DIGITAL CAMERAS";
N[161]="HARDWARE";
N[162]="GENERAL";
N[163]="BOOKS";
N[164]="CPUS";
N[165]="DRIVES";
N[166]="CD ROM";
N[167]="IDE";
N[168]="SCSI";
N[169]="FLOPPY, OTHER";
N[170]="INPUT PERIPHERALS";
N[171]="MACINTOSH";
N[1479]="MAINFRAMES";

*FIG. 8P*

```
N[1480]="MEMORY";
N[172]="GENERAL";
N[1481]="RAM";
N[1482]="SDRAM";
N[173]="MODEMS";
N[174]="MONITORS";
N[1244]="MOTHERBOARDS";
N[175]="MULTIMEDIA";
N[176]="NETWORKING";
N[177]="PORTABLE";
N[1245]="PRINTERS";
N[178]="GENERAL";
N[1246]="ACCESSORIES";
N[1483]="SUPPLIES";
N[179]="PC SYSTEMS";
N[1484]="SERVERS";
N[1485]="TERMINALS";
N[1486]="UNIX";
N[180]="VIDEO";
N[1247]="VINTAGE";
N[181]="SOFTWARE";
N[182]="GENERAL";
N[183]="BOOKS";
N[184]="BUSINESS";
N[1248]="CHILDREN'S";
N[185]="DESKTOP PUBLISHING";
N[186]="EDUCATIONAL";
N[1249]="GAMES";
N[187]="GENERAL";
N[1250]="ATARI";
N[1487]="COMMODORE";
N[1488]="SEGA";
N[1489]="SONY";
N[1490]="NINTENDO";
N[1654]="GAMES:INTERNET";
N[1655]="ULTIMA ONLINE";
N[188]="GRAPHICS, MULTIMEDIA";
N[189]="MACINTOSH";
N[1251]="PROGRAMMING";
N[1252]="REFERENCE";
N[1505]="UTILITIES";
N[191]="GENERAL";
N[1506]="AUCTION UTILITIES";
N[192]="SERVICES";
N[193]="GENERAL";
N[1253]="INFORMATIONAL";
N[1491]="GENERAL";
N[1311]="AUCTION SERVICES";
N[194]="WEB HOSTING";
N[237]="DOLLS, FIGURES";
N[238]="DOLLS";
N[239]="GENERAL";
N[326]="ANTIQUE";
N[32]="GENERAL";
N[340]="BISQUE";
N[341]="COMPOSITION";
N[327]="ARTIST";
N[328]="CLOTH";
N[339]="GENERAL";
N[241]="RAGGEDY ANN, ANDY";
N[329]="CLOTHES, ACCESSORIES";
N[342]="ANTIQUE, VINTAGE";
N[343]="MODERN";
N[330]="EFFANBEE";
N[1032]="FASHION (NON-BARBIE)";
N[331]="GENERAL";
N[1033]="GENE";
N[1201]="FURNITURE";
N[332]="HARD PLASTIC";
N[1202]="HOUSE, MINIATURES";
N[333]="GENERAL";
N[1203]="VINTAGE";
N[334]="IDEAL";
N[240]="MADAME ALEXANDER";
N[335]="MATTEL";
N[336]="MODERN";
N[344]="GENERAL";
N[243]="CABBAGE PATCH";
N[1034]="HOLLY HOBBIE";
N[1204]="RAINBOW BRITE";
N[2439]="SPICE GIRLS";
N[242]="STRAWBERRY SHORTCAKE";
N[337]="NANCY ANN";
N[368]="PAPER DOLLS";
N[1205]="PATTERNS";
N[338]="VOGUE";
N[1035]="GENERAL";
N[345]="GINNY";
N[346]="GINNETTE";
N[347]="JILL, JEFF";
N[4380]="AUSTRALIAN DOLLS";
N[4379]="GENERAL";
```

*FIG. 8Q*

```
N[244]="FIGURES";
N[245]="GENERAL";
N[1206]="TROLLS";
N[247]="BARBIE";
N[248]="GENERAL";
N[249]="ACCESSORIES";
N[250]="VINTAGE BARBIE";
N[251]="VINTAGE ACCESSORIES";
N[281]="JEWELRY, GEMSTONES";
N[488]="BEADS";
N[489]="GENERAL";
N[490]="SUPPLIES";
N[491]="GEMSTONES";
N[282]="GENERAL";
N[492]="FACETED, CABOCHON";
N[493]="SPECIMEN, ROUGH";
N[494]="SETTINGS, TOOLS";
N[495]="PACKAGING, DISPLAY";
N[283]="JEWELRY";
N[284]="GENERAL";
N[288]="ANCIENT/ETHNOGRAPHIC";
N[496]="BEADED";
N[497]="GENERAL";
N[498]="ANTIQUE, VINTAGE";
N[516]="CONTEMPORARY, NEW";
N[287]="CARVED, CAMEO";
N[499]="CONTEMPORARY";
N[500]="COSTUME";
N[289]="GENERAL";
N[501]="ANTIQUE, VINTAGE";
N[502]="BAKELITE, PLASTICS";
N[503]="CONTEMPORARY";
N[504]="DESIGNER, SIGNED";
N[505]="FINE";
N[506]="GOLD";
N[286]="GENERAL";
N[507]="ANTIQUE, VINTAGE";
N[508]="CONTEMPORARY";
N[509]="DESIGNER, SIGNED";
N[510]="SILVER";
N[285]="GENERAL";
N[511]="ANTIQUE, VINTAGE";
N[512]="CONTEMPORARY";
N[513]="DESIGNER, SIGNED";
N[514]="VICTORIAN";
N[291]="VINTAGE";

N[290]="WATCHES";
N[1047]="PHOTO & ELECTRONICS";
N[293]="CONSUMER ELECTRONICS";
N[294]="GENERAL";
N[1497]="AUDIO EQUIPMENT";
N[295]="GENERAL";
N[1498]="AUTO";
N[1499]="HOME";
N[1500]="RADIO EQUIPMENT";
N[296]="GENERAL";
N[1501]="CB";
N[1502]="HAM";
N[1503]="TELEPHONE";
N[1504]="TEST EQUIPMENT";
N[625]="PHOTO EQUIPMENT";
N[297]="GENERAL";
N[706]="ACCESSORIES";
N[707]="LENSES";
N[708]="LIGHTING, METERS";
N[709]="SUBMINIATURE";
N[710]="MEDIUM FORMAT";
N[627]="LARGE FORMAT";
N[626]="35MM";
N[628]="MOVIE";
N[629]="DARKROOM EQUIPMENT";
N[711]="VINTAGE, COLLECTIBLE";
N[712]="INSTRUCTION, MANUALS";
N[298]="VIDEO EQUIPMENT";
N[870]="POTTERY & GLASS";
N[13]="GLASS";
N[14]="GENERAL";
N[955]="ART GLASS";
N[15]="GENERAL";
N[988]="N.AMERICAN";
N[989]="BOHEMIAN";
N[990]="CZECH";
N[991]="ENGLISH";
N[992]="FRENCH";
N[993]="IRISH";
N[994]="ITALIAN";
N[995]="SCANDINAVIAN";
N[16]="CARNIVAL";
N[996]="CONTEMPORARY GLASS";
N[997]="GENERAL";
N[998]="BOYD";
N[2685]="CAITHNESS";
```

FIG. 8R

```
N[999]="CRYSTAL";
N[1000]="DEGENHART";
N[1001]="MOSSER";
N[1002]="DEPRESSION";
N[17]="GENERAL";
N[1003]="ANCHOR HOCKING";
N[1004]="FEDERAL";
N[1005]="HAZEL ATLAS";
N[1006]="INDIANA";
N[1007]="JEANNETTE";
N[1008]="MACBETH-EVANS";
N[1009]="U.S.GLASS";
N[1010]="40S, 50S, 60S";
N[1011]="KITCHEN GLASSWARE";
N[1012]="GENERAL";
N[1013]="ACCESSORIES/UTENSILS";
N[1014]="BUTTER DISHES";
N[1015]="CRUETS";
N[1016]="MEASURING CUPS";
N[1017]="REAMERS";
N[1018]="SWANKY SWIGS";
N[22]="EAPG";
N[1020]="ELEGANT";
N[23]="GENERAL";
N[1021]="CAMBRIDGE";
N[1022]="DUNCAN MILLER";
N[1023]="FOSTORIA";
N[1024]="HEISEY";
N[1025]="IMPERIAL";
N[1026]="MORGANTOWN";
N[1027]="NEW MARTINSVILLE";
N[1028]="PADEN CITY";
N[1029]="TIFFIN";
N[1030]="WESTMORELAND";
N[21]="FENTON";
N[1019]="FIRE KING";
N[18]="MILK";
N[1229]="OPALESCENT";
N[20]="PAPERWEIGHTS";
N[1230]="STAINED GLASS";
N[1031]="SWAROVSKI";
N[19]="VASELINE";
N[27]="POTTERY";
N[86]="GENERAL";
N[2751]="ASIAN";
N[442]="BAUER";

N[4386]="BENDIGO";
N[1231]="BLUE RIDGE";
N[1043]="BRITISH ART";
N[1232]="BUFFALO";
N[443]="CALIFORNIA POTTERY";
N[2755]="CARLTON";
N[783]="COLORADO POTTERY";
N[784]="DAKOTA POTTERY";
N[2761]="DELFT";
N[444]="DINNERWARE";
N[1044]="EUROPEAN ART";
N[473]="FIESTA: CONTEMPORARY";
N[87]="FIESTA: VINTAGE";
N[448]="FRANCISCAN";
N[449]="FRANKOMA, GRACETONE";
N[450]="HALL";
N[589]="HAEGER";
N[1233]="HEADVASES";
N[451]="HOMER LAUGHLIN";
N[452]="HULL";
N[453]="MAJOLICA";
N[89]="MCCOY";
N[454]="METLOX";
N[1234]="MOORCROFT";
N[1235]="NEWCOMB";
N[1236]="OWENS";
N[1237]="PFALTZGRAFF";
N[455]="RED WING, RUMRILL";
N[90]="ROOKWOOD";
N[96]="ROSEVILLE";
N[456]="ROYAL COPLEY";
N[457]="RUSSEL WRIGHT";
N[1045]="SCANDINAVIAN ART";
N[91]="SHAWNEE";
N[2789]="SPODE";
N[458]="STAFFORDSHIRE";
N[459]="STANGL";
N[517]="TABLEWARES";
N[1238]="TEA POTS, TEA SETS";
N[1239]="UHL";
N[2792]="WADE ";
N[1240]="WALL POCKETS";
N[460]="WATT";
N[461]="WELLER";
N[590]="VAN BRIGGLE";
N[1046]="VERNON KILNS";
```

*FIG. 8S*

```
N[24]="PORCELAIN";
N[25]="GENERAL";
N[462]="CHINTZ, SHELLEY";
N[463]="DECORATIVE";
N[464]="DINNERWARE";
N[26]="FIGURINES";
N[474]="FIGURINES: ANIMAL";
N[1241]="FLOW BLUE";
N[466]="HAVILAND, LIMOGES";
N[88]="HUMMEL, GOEBEL";
N[468]="LEFTON";
N[92]="LENOX";
N[2805]="LIMOGES";
N[1242]="LLADRO";
N[2810]="MINTON";
N[93]="NIPPON";
N[94]="NORITAKE";
N[469]="OCCUPIED JAPAN";
N[470]="PRECIOUS MOMENTS";
N[1243]="ROYAL BAYREUTH";
N[95]="ROYAL DOULTON";
N[471]="RS PRUSSIA, RELATED";
N[2817]="SPODE";
N[2818]="VILLEROY & BOCH";
N[2819]="WADE";
N[472]="WEDGWOOD";
N[888]="SPORTS MEMORABILIA";
N[51]="AUTOGRAPHS: SPORTS";
N[52]="GENERAL";
N[53]="BASEBALL";
N[54]="BASKETBALL";
N[55]="FOOTBALL";
N[1223]="GOLF";
N[56]="HOCKEY";
N[1224]="OLYMPIC";
N[1225]="RACING";
N[2841]="SOCCER";
N[1226]="TENNIS";
N[202]="MEMORABILIA";
N[203]="GENERAL";
N[2846]="AUSTRALIAN FOOTBALL";
N[204]="BASEBALL";
N[205]="BASKETBALL";
N[1227]="BOXING";
N[2853]="CRICKET";
N[2856]="DARTS";
N[206]="FOOTBALL";
N[428]="GOLF";
N[2867]="GYMNASTICS";
N[780]="HOCKEY";
N[429]="HORSE RACING";
N[465]="ICE SKATING";
N[1228]="INDY 500";
N[207]="NASCAR";
N[788]="OLYMPIC";
N[4396]="OLYMPIC PINS";
N[2876]="RACING - FORMULA 1";
N[2880]="RUGBY - LEAGUE";
N[2881]="RUGBY - UNION";
N[2883]="SAILING & BOATING";
N[2885]="SOCCER";
N[2895]="SWIMMING";
N[430]="TENNIS";
N[212]="TRADING CARDS";
N[634]="BASEBALL";
N[213]="GENERAL";
N[635]="BOX";
N[636]="LOTS";
N[637]="PACKS";
N[638]="ROOKIES";
N[639]="SETS";
N[641]="SINGLES: PRE 1950";
N[642]="SINGLES: 1950 - 1980";
N[643]="SINGLES:1981 - NOW";
N[644]="BASKETBALL";
N[214]="GENERAL";
N[645]="BOX";
N[646]="LOTS";
N[647]="PACKS";
N[648]="ROOKIES";
N[649]="SETS";
N[650]="SINGLES";
N[651]="FOOTBALL";
N[215]="GENERAL";
N[652]="BOX";
N[653]="LOTS";
N[654]="PACKS";
N[655]="ROOKIES";
N[656]="SETS";
N[657]="SINGLES";
N[658]="HOCKEY";
N[216]="GENERAL";
```

*FIG. 8T*

```
N[659]="BOX";
N[660]="LOTS";
N[661]="PACKS";
N[662]="ROOKIES";
N[663]="SETS";
N[664]="SINGLES";
N[217]="OTHER SPORTS";
N[665]="RACING";
N[666]="NASCAR";
N[667]="NHRA";
N[2971]="SOCCER";
N[2970]="GENERAL";
N[1222]="MINOR LEAGUE";
N[220]="TOYS, BEAN BAG PLUSH";
N[246]="ACTION FIGURES";
N[348]="GENERAL";
N[4299]="DR. WHO";
N[746]="BABYLON 5";
N[1167]="GI JOE";
N[349]="GENERAL";
N[1168]="12 INCH";
N[747]="GODZILLA";
N[1169]="MEGO";
N[748]="MOVIE";
N[749]="POWER RANGERS";
N[750]="STAR TREK";
N[751]="STAR WARS";
N[752]="SUPER HERO";
N[753]="TRANSFORMERS";
N[754]="SPORTS";
N[350]="GENERAL";
N[755]="STARTING LINE UP";
N[1170]="WRESTLING";
N[436]="BEAN BAG PLUSH";
N[230]="GENERAL";
N[1609]="ACCESSORIES";
N[437]="GENERAL";
N[1610]="BOXES, DISPLAYS";
N[1611]="CLOTHES, COSTUMES";
N[1612]="TAG PROTECTORS";
N[1613]="BAMMERS, BAMM BEANOS";
N[1522]="GENERAL";
N[1614]="BASEBALL";
N[1615]="FOOTBALL";
N[1616]="COCA COLA BEAN BAGS";
N[1617]="DISNEY";
N[439]="GENERAL";
N[1618]="MICKEY AND MINNIE";
N[1619]="POOH AND FRIENDS";
N[1620]="GRATEFUL DEAD";
N[1621]="MEANIES";
N[1622]="PLANET PLUSH";
N[1623]="TY BEANIES";
N[438]="GENERAL";
N[1624]="BEARS";
N[1625]="HOLIDAY, SEASONAL";
N[1608]="TY OTHER PRODUCTS";
N[1037]="GENERAL";
N[1036]="ATTIC:GENERAL";
N[1627]="ATTIC:RETIRED";
N[1628]="BEANIE BUDDIES";
N[1631]="PILLOW PALS:CURRENT";
N[1633]="PILLOW PALS:RETIRED";
N[1634]="PLUSH:CURRENT";
N[1636]="PLUSH:RETIRED";
N[1637]="SPORTS COMMEMORATIVE";
N[1638]="TY RETIRED BEANIES";
N[440]="GENERAL";
N[1639]="BEARS";
N[1640]="HOLIDAY, SEASONAL";
N[1641]="TY TEENIE BEANIES";
N[441]="GENERAL";
N[1642]="BEANIES";
N[1643]="PINS";
N[1653]="TY TRADING CARDS";
N[1496]="GENERAL";
N[1644]="CASES";
N[1645]="BOXES";
N[1646]="PACKS";
N[1647]="SINGLES, SETS";
N[781]="WARNER BROS";
N[222]="DIECAST";
N[223]="GENERAL";
N[757]="CORGI";
N[782]="DANBURY MINT";
N[1038]="DINKY";
N[758]="ERTL";
N[759]="FRANKLIN MINT";
N[1171]="HOTWHEELS";
N[224]="GENERAL";
N[1172]="RED LINE";
N[760]="JOHNNY LIGHTNING";
```

*FIG. 8U*

```
N[1173]="LLEDO";
N[1174]="MATCHBOX";
N[761]="GENERAL";
N[1175]="LESNEY";
N[762]="NASCAR";
N[225]="GENERAL";
N[763]="ACTION/REVELL";
N[764]="RACING CHAMPIONS";
N[765]="WINNERS CIRCLE";
N[766]="NHRA";
N[767]="FAST FOOD";
N[231]="GENERAL";
N[768]="MCDONALDS";
N[769]="BURGER KING";
N[770]="WENDYS";
N[374]="FISHER PRICE";
N[233]="GAMES";
N[234]="GENERAL";
N[1176]="BOARD GAMES";
N[235]="GENERAL";
N[1177]="HORROR/MONSTER";
N[1178]="MOVIE/TV";
N[1179]="SPACE";
N[1180]="SPORTS";
N[1181]="WAR GAMES";
N[1182]="ELECTRONIC";
N[1183]="ROLE PLAYING";
N[1184]="VINTAGE";
N[1082]="ELECTRONIC PETS";
N[232]="GENERAL";
N[1083]="FURBY";
N[1084]="TAMAGOTCHI";
N[1199]="HOBBIES";
N[1039]="GENERAL";
N[1200]="REMOTE CONTROL";
N[771]="MARBLES";
N[236]="CONTEMPORARY";
N[772]="VINTAGE";
N[1040]="MODERN";
N[221]="GENERAL";
N[1185]="BATTERY OPERATED";
N[1041]="WINDUP";
N[1042]="VEHICLES";
N[1186]="LEGO";
N[4318]="MECCANO";
N[1187]="SPACE TOYS";

N[375]="MY LITTLE PONY";
N[773]="PEANUTS GANG";
N[1188]="PLASTIC MODELS";
N[774]="GENERAL";
N[1189]="AIR";
N[1190]="AUTOMOTIVE";
N[1191]="MILITARY";
N[1192]="MONSTER";
N[1193]="SCIENCE FICTION";
N[1194]="SPACE";
N[226]="PLUSH";
N[227]="GENERAL";
N[775]="BEARS";
N[228]="CARE BEARS";
N[1195]="GARFIELD";
N[1524]="POKEMON";
N[776]="SLOT CARS";
N[756]="TELETUBBIES";
N[1196]="TOY RINGS";
N[2005]="TOY SOLDIERS";
N[1197]="WOODEN";
N[735]="VINTAGE TIN";
N[736]="GENERAL";
N[229]="WIND-UP";
N[737]="FRICTION";
N[738]="VINTAGE VEHICLES";
N[739]="GENERAL";
N[740]="CONSTRUCTION";
N[741]="FARM TOYS";
N[742]="MOTORCYCLES";
N[743]="PRESSED STEEL";
N[744]="RUBBER";
N[745]="SLUSH";
N[717]="VINTAGE";
N[30]="GENERAL";
N[718]="ANIMAL DRAWN";
N[719]="BATTERY OPERATED";
N[720]="CAP GUNS";
N[721]="CAST IRON";
N[722]="CELLULOID";
N[723]="CHARACTER";
N[724]="ERECTOR SETS";
N[725]="PAPER TOYS";
N[726]="PEDAL CARS";
N[727]="PLAY SETS";
N[728]="PULL TOYS";
```

*FIG. 8V*

```
N[729]="PUPPETS";
N[730]="PUZZLES";
N[731]="RAMP WALKERS";
N[732]="RIDE ONS";
N[733]="SPACE TOYS";
N[1198]="TOY PARTS";
N[734]="TOY SOLDIERS";
N[99]="MISCELLANEOUS";
N[324]="GENERAL";
N[319]="ADULT ONLY";
N[320]="GENERAL";
N[1604]="ANIMATION";
N[882]="ART: NUDE";
N[1605]="AUTOGRAPHS";
N[379]="BOOKS";
N[322]="CD";
N[1273]="DVD";
N[1274]="LASERDISC";
N[613]="MAGAZINES";
N[323]="PHOTOGRAPHIC";
N[558]="PIN UPS";
N[923]="POSTCARDS";
N[1606]="TRADING CARDS";
N[321]="VIDEO";
N[2190]="AUTOMOTIVE";
N[2191]="COLLECTOR VEHICLES";
N[2192]="GENERAL";
N[2193]="ACCESSORIES";
N[2030]="COLLECTOR CARS";
N[2031]="PARTS";
N[1254]="GENERAL VEHICLES";
N[292]="GENERAL";
N[1255]="ACCESSORIES";
N[1258]="CARS";
N[1256]="PARTS";
N[1260]="RV'S";
N[1259]="TRUCKS";
N[422]="MOTORCYCLES";
N[424]="GENERAL";
N[4322]="BRITISH & EUROPEAN";
N[425]="HARLEY DAVIDSON";
N[467]="JAPANESE";
N[1261]="BABY ITEMS";
N[302]="BUSINESS, OFFICE";
N[311]="CLOTHING";
N[312]="GENERAL";
N[1059]="MEN";
N[313]="GENERAL";
N[1060]="ACCESSORIES";
N[1061]="BIG AND TALL";
N[1262]="BOOTS,SHOES";
N[1062]="WOMEN";
N[314]="GENERAL";
N[1063]="ACCESSORIES";
N[1263]="EVENING WEAR";
N[1264]="MATERNITY";
N[1064]="PLUS SIZES";
N[1065]="SHOES";
N[1265]="WEDDING";
N[1066]="CHILDREN";
N[315]="GENERAL";
N[1067]="BOYS";
N[1068]="GIRLS";
N[1069]="TODDLER";
N[1070]="INFANT";
N[1048]="EQUESTRIAN EQUIPMENT";
N[1266]="EQUIPMENT";
N[1267]="GENERAL";
N[1268]="CONSTRUCTION";
N[1269]="FARM";
N[1270]="INDUSTRIAL";
N[1271]="RESTAURANT";
N[1272]="SHOP";
N[1275]="FOODSTUFF";
N[2032]="GARDEN ITEMS";
N[519]="GENERAL";
N[2034]="GARDEN ACCESSORIES";
N[1509]="PLANTS/SEEDS";
N[2033]="GENERAL";
N[1511]="FLOWERS";
N[1510]="INDOOR PLANTS";
N[1512]="VEGETABLES";
N[2035]="PUBLICATIONS";
N[1276]="HARDWARE SUPPLIES";
N[299]="HOUSEHOLD";
N[300]="GENERAL";
N[1277]="BEAUTY";
N[1278]="FITNESS";
N[1279]="HEALTH";
N[1280]="HOME FURNISHINGS";
N[1281]="PET SUPPLIES";
N[301]="GENERAL";
```

*FIG. 8W*

```
N[1282]="BATHROOM ACCESSORIES";
N[1283]="CANINE";
N[1284]="FELINE";
N[1285]="REPTILE";
N[1286]="RODENT";
N[1523]="METAPHYSICAL";
N[619]="MUSICAL INSTRUMENTS";
N[308]="GENERAL";
N[620]="BRASS";
N[1287]="ELECTRONIC";
N[1288]="EQUIPMENT";
N[621]="GUITARS";
N[1289]="KEYBOARD, PIANO";
N[622]="PERCUSSION";
N[623]="STRING";
N[624]="WOODWIND";
N[1607]="REAL ESTATE";
N[316]="SERVICES";
N[317]="GENERAL";
N[318]="INFORMATION SERVICES";
N[1290]="SHIPPING";
N[1304]="SHOW SUPPLIES";
N[382]="SPORTING GOODS";
N[310]="GENERAL";
N[1291]="ARCHERY";
N[2022]="BASEBALL";
N[2023]="BASKETBALL";
N[2904]="BICYCLES";
N[1292]="BILLIARDS";
N[1293]="BOATING";
N[1294]="GENERAL";
N[1295]="JET SKI";
N[1296]="POWER";
N[1297]="SAIL";
N[2020]="CAMPING";
N[2907]="DARTS";
N[1521]="EXERCISE EQUIPMENT";
N[1492]="FISHING";
N[384]="GENERAL";
N[1493]="LURES";
N[1494]="REELS";
N[1495]="RODS";
N[2024]="FOOTBALL";
N[1513]="GOLF";
N[630]="GENERAL";
N[1514]="ACCESSORIES";
```

*FIG. 8X*

```
N[1515]="DRIVERS/WOODS";
N[1516]="GOLF BALLS";
N[1517]="IRONS";
N[1518]="PUTTERS";
N[1519]="SETS";
N[1520]="WEDGES";
N[2021]="HIKING";
N[383]="HUNTING";
N[1299]="ROCK CLIMBING";
N[2912]="RUGBY";
N[1300]="SCUBA";
N[1301]="SKATING";
N[1302]="SKIING";
N[1303]="SNOW BOARDING";
N[2914]="SOCCER";
N[2916]="SURFING";
N[2917]="TENNIS";
N[1305]="TICKETS";
N[1306]="GENERAL";
N[1307]="CONCERT";
N[1308]="SPORTING EVENTS";
N[1309]="THEATRE";
N[631]="TOOLS";
N[303]="HAND";
N[632]="POWER";
N[633]="INDUSTRIAL";
N[1310]="TRAVEL";
C[353]=NEW ARRAY(12,355,1207,2194,2195,2203,2207,1208,357,1209,2205,1210,1211,359,1217,360,4300,361,2218,
1218,1219,1220);
C[2195]=NEW ARRAY(356,2197,2196,2198,2200,2201,2202);
C[2207]=NEW ARRAY(2204,4171,4170,4173,4172);
C[1211]=NEW ARRAY(358,4175,1212,1213,4176,1214,1215,1216);
C[2218]=NEW ARRAY(362,2222,2219,2220,2221,2225,2223,2224);
C[1220]=NEW ARRAY(364,1221);
C[266]=NEW ARRAY(267,607,380,304);
C[267]=NEW ARRAY(268,1092,1093,1105,270,2231,2233,274,1135,1134,269,1136);
C[1093]=NEW ARRAY(279,2226,1094,1095,1096,1097,2227,1099,1100,1101,1098,1102,1103,1104);
C[1105]=NEW ARRAY(2228,1106,1107,1108,1109,1110,1111,1112,1113,1114,1115,2026);
C[270]=NEW ARRAY(377,271,2229,1116,1117,1118,272,2230,325,273,1119);
C[2231]=NEW ARRAY(1120,2232);
C[274]=NEW ARRAY(378,1121,277,278,276,2234,1122,1123,1124,1125,1126,2235,1127,2236,2237,1128,1129,1130,
2238,1131,2239,275,2240,1132,1133);
C[607]=NEW ARRAY(280,608,1137,2241,616,2242,609,1138,2243,1139,1140,1141,1142,1143,610,2244,1144,611,1145,
2245,2246,612,1146,1147,1148,614,1149,1150,1160,615);
```

*FIG. 8Y*

```
C[380]=NEW ARRAY(1151,2286,2287,2288,1508,4340,1477,1478,1476,381);
C[1151]=NEW ARRAY(309,1161,2274,1162,1163,1164,1165,1166,2275,2276,2277,1470,1471,4180,2278,2279,1472,
2280,1473,1474,1475,2282,2281,2283,2284,2285);
C[2288]=NEW ARRAY(617,2289,2290,2291,2292,2293,2294,2295,2296,2297,2298,4179,2299,2301,2300,2302,2303,
2304,2305,2306,2307,2308,2309,2310,4178);
C[4340]=NEW ARRAY(4341,4345,4346,4348,4352);
C[304]=NEW ARRAY(305,1049,1071,1603);
C[1049]=NEW ARRAY(307,2027,1559,1050,2247,1051,1560,1052,1561,1562,2248,1053,3362,1563,2249,2250,1564,
1056,1565,1566,1567,2251,1568,1057,2252,1570,2253,1569,1571,1054,1572,1573,1055,1574,1575,1058,1576,2254,
1577,1578,1579);C[1071]=NEW
ARRAY(306,2265,2266,2028,1580,1072,2255,1073,2256,2257,1074,1581,1582,2258,1075,3366,1583,2259,2260,1584,
1078,1585,1586,1587,2261,1588,1079,1080,2262,1590,2263,1589,1591,1076,1592,1593,1077,1594,1595,1081,1596,
2264,1597,1598,1599);
C[1603]=NEW ARRAY(618,1601,1600,2267,1602);
C[866]=NEW ARRAY(252,259,260,704);
C[252]=NEW ARRAY(3368,256,3394,253);
C[3368]=NEW ARRAY(3376,3375,4478,3372,3369,3373,3371,3370,3374);
C[256]=NEW ARRAY(257,532,533,534,535,536,537,538,539,540,541,542,543,544,545,546,547,385,258,548,549);
C[3394]=NEW ARRAY(3404,3396,3403,3398,3400,3399,3410,4397,3406,4477,3407,3405,4398,3402,3408,3397,3409,
3401);
C[253]=NEW ARRAY(786,254,255,525,528,529,376,867,523,524,527,522,526,520,530,521,531);
C[260]=NEW ARRAY(261,352,3468,3499);
C[261]=NEW ARRAY(262,675,676,678,679,680,681,682,683,684,685,686,687,688,689,690,691,265);
C[352]=NEW ARRAY(264,692,693,263,694,695,696,697,698,699,700,701,702,703);
C[3468]=NEW ARRAY(3467,3469,3470,3471,3472,3473,3474,3475,3476);
C[3499]=NEW ARRAY(3498,3504,3503,3513,3502,3510,3507,3506,3501,3509,3508,3505,3500,3511);
C[704]=NEW ARRAY;C[704][0]=705;
C[1]=NEW ARRAY(34,1335,1529,1344,555,550,49,884,887,3265,386,394,889,562,388,898,791,2016,397,3944,1353,63,
109,120,98,1365,137,4036,4037,128,4038,792,4042,4043,3547,402,1400,576,2000,907,795,3628,81,1401,1404,581,
3557,1409,476,1412,4065,195,1430,134,4072,4082,3632,984,713,4083,4085,373,124,4097,1442,407,2036,928,4100,
4108,1443,931,1446,4115,412,152,1451,3637,1460,592,985,3638,940,593,4121,868,479,1444,417,1464,597,110,113,
1466,987,4162,966,159);
C[34]=NEW ARRAY(35,805,1313,1321,871,872,1322,796,43,797,865,817,798,820,826,1525,827,3885,1526,875,39,3893,
1527,799,
3894,800,845,849,1333,840,804,876,36,878,879,801,863,803,880,858,802);
C[805]=NEW ARRAY(806,807,808,809,810,3865,811,812,813,1312);
C[1313]=NEW ARRAY(1314,3872,1315,1316,1317,3871,1318,1319,4400,3874,1320);
C[872]=NEW ARRAY(873,874);
C[43]=NEW ARRAY(44,3880,45,814,3879,815,4266,816);
C[817]=NEW ARRAY(818,819,3881);
C[820]=NEW ARRAY(821,4595,4372,824,4270,822,823,825,3882,3883);
C[827]=NEW ARRAY(828,830,3884,831,829);
C[39]=NEW ARRAY(40,3888,1328,41,839,1329,1330,864,832,833,834,835,42,836,837,1331,838,1332);
C[845]=NEW ARRAY(846,3895,847,848);
C[849]=NEW ARRAY(850,851);
C[840]=NEW ARRAY(841,842,843,844);
```

*FIG. 8Z*

```
C[36]=NEW ARRAY(37,852,853,38,877,1334,854,855,3897,856,857);
C[858]=NEW ARRAY(859,860,861,862);
C[1335]=NEW ARRAY(1336,1337,1338,3230,1339,1340,1528,3898,1341,1342,3238,1343);[1529]=NEW ARRAY(1530,
1531,1532,1533);
C[1344]=NEW ARRAY(363,1534,1345,1535,1536,1537);
C[555]=NEW ARRAY(47,777,1086,556,881,557,559,560,561,3899);
C[550]=NEW ARRAY(551,552,553,554);
C[49]=NEW ARRAY(50,57,3900,883,3901,62);
C[57]=NEW ARRAY(58,59,1346,60,61);
C[884]=NEW ARRAY(149,885,886);
C[3265]=NEW ARRAY(3269,3273);
C[386]=NEW ARRAY(117,387,31,3902,1347,1538,3906,1539,1540,392,779,3910);
C[3902]=NEW ARRAY(389,3904,3903);
C[1347]=NEW ARRAY(390,3905,1348,3877);
C[3906]=NEW ARRAY(391,3907,3908,3909);
C[3910]=NEW ARRAY(393,3911,3912);
C[889]=NEW ARRAY(369,1349,890,891,892,893,894,895,896,3914,897,1350,1351);
C[562]=NEW ARRAY(118,563,3915,565,566,567,568,569,3920,571,572);
C[3915]=NEW ARRAY(564,3916,3917,3918,3919);
C[3920]=NEW ARRAY(570,3921,3922,3923,3924,3925);
C[898]=NEW ARRAY(573,899,3443,3512);
C[2016]=NEW ARRAY(2017,3926,3927,1541,2018,2019);
C[397]=NEW ARRAY(3932,3928,401,3937,3941,400);
C[3932]=NEW ARRAY(1352,3933,3934,3935);
C[3928]=NEW ARRAY(119,3929,3930,3931);
C[3937]=NEW ARRAY(398,3940,3938,3939);
C[3941]=NEW ARRAY(399,3942,4189,3943);
C[3944]=NEW ARRAY(575,3945,3946,3947,3948,3949,3950);
C[1353]=NEW ARRAY(574,3951,1354,1355,1356,1357,1358,1359,1360,1361);
C[63]=NEW ARRAY(78,64,72,3952,80,3965,3953,66,3954,3957,900,3955,79,3984,65,3989,73);
C[3965]=NEW ARRAY(3752,3966,3967,3968,3969,3970,3971);
C[66]=NEW ARRAY(67,3972,69,71,70,3973,68,3974,3975);
C[3957]=NEW ARRAY(3956,3960,3962,3964);
C[900]=NEW ARRAY(77,901,902,903,3979,3980,3981,3982,3983);
C[3984]=NEW ARRAY(972,3985,3986,3987);
C[3989]=NEW ARRAY(3988,3990,3991,3992,3993,3994,3995,3996,3997,3998,3999);
C[73]=NEW ARRAY(74,3976,76,3977,75,3978);
C[120]=NEW ARRAY(121,953,954,1087,1362,1363,904,1364);
C[1087]=NEW ARRAY(122,1088);
C[904]=NEW ARRAY(123,905,906);
C[98]=NEW ARRAY(100,4018,4019,97,4020,4021,4022,4023,1543,4024,4025,104,4026,1545,103,105,1544,101,108,107,1546,
4027,4028,4029,4030,106,4031,1542);
C[1365]=NEW ARRAY(370,4032,4033,1366,1547,4034,4035,1367,1368);
C[137]=NEW ARRAY(1369,139);
```

*FIG. 8A2*

```
C[1369]=NEW ARRAY(138,1370,1371,144,1372,1373,1374,141,1375,1376,1377,1378,1379,1380,142,143,1381,1382,1383,145,1384);
C[139]=NEW ARRAY(140,1385,1386,1387,1388,1389,1390,1391,1392,1152,1393,1394,1395,1396,1397,1398,1399);
C[4038]=NEW ARRAY(396,4039,4040,4041);
C[792]=NEW ARRAY(793,794);
C[402]=NEW ARRAY(403,404,1548,4044,405,518,1549,1550);
C[576]=NEW ARRAY(147,973,577,578,579);
C[2000]=NEW ARRAY(2001,2002,2003,2004);
C[907]=NEW ARRAY(365,1089,909,910,4045,911,912,913);
C[1089]=NEW ARRAY(908,148,1090,1091);
C[81]=NEW ARRAY(82,4046,4047,974,977,580,4049,982,978,983);
C[4047]=NEW ARRAY(83,4048);
C[974]=NEW ARRAY(975,976);
C[4049]=NEW ARRAY(84,4051,4050);
C[978]=NEW ARRAY(979,980,981);
C[1401]=NEW ARRAY(475,1402,1403);
C[1404]=NEW ARRAY(371,4062,4053,4057,1407,1408);
C[4053]=NEW ARRAY(1405,4052,4054,4055,4056);
C[4057]=NEW ARRAY(1406,4058,4059,4060,4061);
C[1409]=NEW ARRAY(150,1410,1411);
C[1412]=NEW ARRAY(582,1413);
C[4065]=NEW ARRAY(4064,4066,4067,4068,4069);
C[195]=NEW ARRAY(3629,208,427,196,211,431,1414,1424,778,209);
C[196]=NEW ARRAY(197,4263,2025,2316,198,1417,1419,1420,790,199,200);
C[431]=NEW ARRAY(210,1421,1422,432,433,2007,2008,2009,2010,2011,2012,2013,2014,2015,447,434,435,2354,2355,445,1423,2356);
C[1424]=NEW ARRAY(201,1425,1426,1427,1428,1429);
C[1430]=NEW ARRAY(28,1431,3630,1432,3631,1433,1434,1435,1436);
C[134]=NEW ARRAY(135,4070,583,585,1552,136,587,584,586,588);
C[4072]=NEW ARRAY(4071,4373,4074,4075,4076,4077,4078,4079,4080,4081);
C[4373]=NEW ARRAY(4073,4374,4375);
C[713]=NEW ARRAY(372,714,715,716);
C[4085]=NEW ARRAY(4084,4086,4087,3636);
C[124]=NEW ARRAY(125,4089,4090,4091,4092,126,3633,477,1437,1439,1438,914,1440);
C[914]=NEW ARRAY(127,3634,915,916,4093,917,918,919,920,921,4095,3635,922,4094,924,925,926,927,4096);
C[4097]=NEW ARRAY(151,4098,4099);
C[407]=NEW ARRAY(48,408,409,1507,410,411);
C[928]=NEW ARRAY(395,930,929);
C[4100]=NEW ARRAY(367,4101,4102,4104,4103,4105,4106);
C[4108]=NEW ARRAY(4107,4109,4110,4113,4112,4111,4114);
C[931]=NEW ARRAY(132,932,933,934);
C[1446]=NEW ARRAY(366,1447,1448,4280,1449);
C[412]=NEW ARRAY(413,414,415,416);
C[152]=NEW ARRAY(153,785,1450,591,154,155,156);
C[1451]=NEW ARRAY(157,1452,1453,1454,1455,1456,1457,1458,1459);
C[940]=NEW ARRAY(33,941,942,943,4116,944,945,946,947,948,949,3639,950);
```

*FIG. 8B2*

```
C[593]=NEW ARRAY(133,594,986,951,4117,4118,4120);
C[951]=NEW ARRAY(595,952);
C[4118]=NEW ARRAY(596,4119);
C[4121]=NEW ARRAY(1461,4122,4123);
C[868]=NEW ARRAY(668,1462,478,218,219,1463,669);
C[669]=NEW ARRAY(3737,670,671,672,673);
C[479]=NEW ARRAY(131,480,1556,4283,4144,1557,1558,482,483);
C[4283]=NEW ARRAY;C[4283][0]=4282;
C[4144]=NEW ARRAY(481,4145,4146,4147,4148);
C[483]=NEW ARRAY(4149,484,486,485,487);
C[1444]=NEW ARRAY(130,4125,4131);
C[4125]=NEW ARRAY(4124,4126,4127,4128,4129,4130);
C[4131]=NEW ARRAY(1445,4132,4133,4134,4135,4136,4137);
C[417]=NEW ARRAY(4150,418,419,420,4151,421,423,4152);
C[597]=NEW ARRAY(598,599,4153,600,601,602,4155);
C[110]=NEW ARRAY(111,956);
C[956]=NEW ARRAY(112,957,958,4156,959,960,961,962,963,964,965);
C[113]=NEW ARRAY(114,115,605,4157,1465,116);
C[4157]=NEW ARRAY(606,4159,4158,4160,4161);
C[1466]=NEW ARRAY(515,1467,1468,1469);
C[4162]=NEW ARRAY(426,4163,4164,4165,4166,4167,4168,4169);
C[966]=NEW ARRAY(158,967,968,969,970,971);
C[160]=NEW ARRAY(1085,161,181,192);
C[161]=NEW ARRAY(162,163,164,165,170,171,1479,1480,173,174,1244,175,176,177,1245,179,1484,1485,1486,180,1247);
C[165]=NEW ARRAY(166,167,168,169);
C[1480]=NEW ARRAY(172,1481,1482);
C[1245]=NEW ARRAY(178,1246,1483);
C[181]=NEW ARRAY(182,183,184,1248,185,186,1249,1654,188,189,1251,1252,1505);
C[1249]=NEW ARRAY(187,1250,1487,1488,1489,1490);
C[1654]=NEW ARRAY;C[1654][0]=1655;
C[1505]=NEW ARRAY(191,1506);
C[192]=NEW ARRAY(193,1253,194);
C[1253]=NEW ARRAY(1491,1311);
C[237]=NEW ARRAY(238,244,247);
C[238]=NEW ARRAY(239,326,327,328,329,330,1032,1201,332,1202,334,240,335,336,337,368,1205,338,4380);
C[326]=NEW ARRAY(32,340,341);
C[328]=NEW ARRAY(339,241);
C[329]=NEW ARRAY(342,343);
C[1032]=NEW ARRAY(331,1033);
C[1202]=NEW ARRAY(333,1203);
C[336]=NEW ARRAY(344,243,1034,1204,2439,242);
C[338]=NEW ARRAY(1035,345,346,347);
C[4380]=NEW ARRAY;C[4380][0]=4379;
C[244]=NEW ARRAY(245,1206);
C[247]=NEW ARRAY(248,249,250,251);
```

*FIG. 8C2*

```
C[281]=NEW ARRAY(488,491,283);
C[488]=NEW ARRAY(489,490);
C[491]=NEW ARRAY(282,492,493,494,495);
C[283]=NEW ARRAY(284,288,496,287,499,500,505,506,510,514,291,290);
C[496]=NEW ARRAY(497,498,516);
C[500]=NEW ARRAY(289,501,502,503,504);
C[506]=NEW ARRAY(286,507,508,509);
C[510]=NEW ARRAY(285,511,512,513);
C[1047]=NEW ARRAY(293,625,298);
C[293]=NEW ARRAY(294,1497,1500,1503,1504);
C[1497]=NEW ARRAY(295,1498,1499);
C[1500]=NEW ARRAY(296,1501,1502);
C[625]=NEW ARRAY(297,706,707,708,709,710,627,626,628,629,711,712);
C[870]=NEW ARRAY(13,27,24);
C[13]=NEW ARRAY(14,955,16,996,1002,1010,1011,22,1020,21,1019,18,1229,20,1230,1031,19);
C[955]=NEW ARRAY(15,988,989,990,991,992,993,994,995);
C[996]=NEW ARRAY(997,998,2685,999,1000,1001);
C[1002]=NEW ARRAY(17,1003,1004,1005,1006,1007,1008,1009);
C[1011]=NEW ARRAY(1012,1013,1014,1015,1016,1017,1018);
C[1020]=NEW ARRAY(23,1021,1022,1023,1024,1025,1026,1027,1028,1029,1030);
C[27]=NEW ARRAY(86,2751,442,4386,1231,1043,1232,443,2755,783,784,2761,444,1044,473,87,448,449,450,589,1233,451,452,
453,89,454,1234,1235,1236,1237,455,90,96,456,457,1045,91,2789,458,459,517,1238,1239,2792,1240,460,461,590,1046);
C[24]=NEW ARRAY(25,462,463,464,26,474,1241,466,88,468,92,2805,1242,2810,93,94,469,470,1243,95,471,2817,2818,2819,472);
C[888]=NEW ARRAY(51,202,212,1222);
C[51]=NEW ARRAY(52,53,54,55,1223,56,1224,1225,2841,1226);
C[202]=NEW ARRAY(203,2846,204,205,1227,2853,2856,206,428,2867,780,429,465,1228,207,788,4396,2876,2880,2881,2883,
2885,2895,430);
C[212]=NEW ARRAY(634,644,651,658,217,665,2971);
C[634]=NEW ARRAY(213,635,636,637,638,639,641,642,643);
C[644]=NEW ARRAY(214,645,646,647,648,649,650);
C[651]=NEW ARRAY(215,652,653,654,655,656,657);
C[658]=NEW ARRAY(216,659,660,661,662,663,664);
C[665]=NEW ARRAY(666,667);
C[2971]=NEW ARRAY;C[2971][0]=2970;
C[220]=NEW ARRAY(246,436,222,767,374,233,1082,1199,771,1040,375,773,1188,226,1524,776,756,1196,2005,1197,735,738,717);
C[246]=NEW ARRAY(348,4299,746,1167,747,1169,748,749,750,751,752,753,754);
C[1167]=NEW ARRAY(349,1168);
C[754]=NEW ARRAY(350,755,1170);
C[436]=NEW ARRAY(230,1609,1613,1616,1617,1620,1621,1622,1623,1608,1638,1641,1653,781);
C[1609]=NEW ARRAY(437,1610,1611,1612);
C[1613]=NEW ARRAY(1522,1614,1615);
C[1617]=NEW ARRAY(439,1618,1619);
C[1623]=NEW ARRAY(438,1624,1625);
C[1608]=NEW ARRAY(1037,1036,1627,1628,1631,1633,1634,1636,1637);
C[1638]=NEW ARRAY(440,1639,1640);
```

*FIG. 8D2*

```
C[1641]=NEW ARRAY(441,1642,1643);
C[1653]=NEW ARRAY(1496,1644,1645,1646,1647);
C[222]=NEW ARRAY(223,757,782,1038,758,759,1171,760,1173,1174,762,766);
C[1171]=NEW ARRAY(224,1172);
C[1174]=NEW ARRAY(761,1175);
C[762]=NEW ARRAY(225,763,764,765);
C[767]=NEW ARRAY(231,768,769,770);
C[233]=NEW ARRAY(234,1176,1182,1183,1184);
C[1176]=NEW ARRAY(235,1177,1178,1179,1180,1181);
C[1082]=NEW ARRAY(232,1083,1084);
C[1199]=NEW ARRAY(1039,1200);
C[771]=NEW ARRAY(236,772);
C[1040]=NEW ARRAY(221,1185,1041,1042,1186,4318,1187);
C[1188]=NEW ARRAY(774,1189,1190,1191,1192,1193,1194);
C[226]=NEW ARRAY(227,775,228,1195);
C[735]=NEW ARRAY(736,229,737);
C[738]=NEW ARRAY(739,740,741,742,743,744,745);
C[717]=NEW ARRAY(30,718,719,720,721,722,723,724,725,726,727,728,729,730,731,732,733,1198,734);
C[99]=NEW ARRAY(324,319,2190,1261,302,311,1048,1266,1275,2032,1276,299,1523,619,1607,316,1304,382,1305,631,1310);
C[319]=NEW ARRAY(320,1604,882,1605,379,322,1273,1274,613,323,558,923,1606,321);
C[2190]=NEW ARRAY(2191,1254,422);
C[2191]=NEW ARRAY(2192,2193,2030,2031);
C[1254]=NEW ARRAY(292,1255,1258,1256,1260,1259);
C[422]=NEW ARRAY(424,4322,425,467);
C[311]=NEW ARRAY(312,1059,1062,1066);
C[1059]=NEW ARRAY(313,1060,1061,1262);
C[1062]=NEW ARRAY(314,1063,1263,1264,1064,1065,1265);
C[1066]=NEW ARRAY(315,1067,1068,1069,1070);
C[1266]=NEW ARRAY(1267,1268,1269,1270,1271,1272);
C[2032]=NEW ARRAY(519,2034,1509,2035);
C[1509]=NEW ARRAY(2033,1511,1510,1512);
C[299]=NEW ARRAY(300,1277,1278,1279,1280,1281);
C[1281]=NEW ARRAY(301,1282,1283,1284,1285,1286);
C[619]=NEW ARRAY(308,620,1287,1288,621,1289,622,623,624);
C[316]=NEW ARRAY(317,318,1290);
C[382]=NEW ARRAY(310,1291,2022,2023,2904,1292,1293,2020,2907,1521,1492,2024,1513,2021,383,1299,2912,1300,1301,1302,1303,2914,2916,2917);
C[1293]=NEW ARRAY(1294,1295,1296,1297);
C[1492]=NEW ARRAY(384,1493,1494,1495);
C[1513]=NEW ARRAY(630,1514,1515,1516,1517,1518,1519,1520);
C[1305]=NEW ARRAY(1306,1307,1308,1309);
C[631]=NEW ARRAY(303,632,633);
C[0]=NEW ARRAY(353,266,866,1,160,237,281,1047,870,888,220,99);
```

*FIG. 8E2*

```
FUNCTION INITMENU(ID)
{
   VAR CATIDARRAY = NEW ARRAY;
   VAR CHOSENCATIDARRAY = NEW ARRAY;

VAR CATEGORYID;
   VAR CHOSENCATEGORY;
   VAR NUMCHILDREN;
   VAR CATID;
   VAR CATNAME;
   VAR LEVEL;
   VAR INDEX;
   VAR I;
VAR J;

// MAKE SURE THE CATEGORYID IS VALID
   IF (N[ID] == NULL)
   {
      CHANGEMENU(-1);
      RETURN;
   }

// INITILIZE
   CATEGORYID = ID;

// CATEGORY LEAF-LEVEL = 0
   LEVEL = 0;

// LOOP THROUGH CATEGORY LIST UNTIL REACHING C[0]
   WHILE (CATEGORYID != 0 && LEVEL < 4)
   {
         CHOSENCATIDARRAY[LEVEL] = CATEGORYID;

OUTERLOOP:
      FOR (I = 0; I < C.LENGTH; I++)
      {
          IF (C[I] == NULL)
             CONTINUE;

FOR (J = 0; J < C[I].LENGTH; J++)
         {
            IF (C[I][J] == CATEGORYID)
            {
               CATEGORYID = I;
               CATIDARRAY[LEVEL] = CATEGORYID;
               BREAK OUTERLOOP;
            }
         }
```

LEVEL++;
   }

// IF CAN'T REACH THE TOP-LEVEL OF CATEGORIES, RETURN
   IF (CATEGORYID != 0)
   {

CHANGEMENU(-1);
      RETURN;
   }
// REVERSE THE ARRAY, SO CATEGORY ROOT-LEVEL = 0
   CATIDARRAY.REVERSE();
   CHOSENCATIDARRAY.REVERSE();

// DISPLAY CATEGORIES
   FOR (INDEX = 0 ; INDEX < CATIDARRAY.LENGTH; INDEX++)
   {
      CATMENU[INDEX].LENGTH = 0;

CHOSENCATEGORY = CATIDARRAY[INDEX];
         NUMCHILDREN = C[CHOSENCATEGORY].LENGTH;

FOR (I = 0; I < NUMCHILDREN; I++)
      {
         CATID = C[CHOSENCATEGORY][I];
         CATNAME = (C[CATID]==NULL) ? N[CATID] : N[CATID]+ " ->";
         CATMENU[INDEX].OPTIONS[I] = NEW OPTION(CATNAME, CATID);

IF (CATID == CHOSENCATIDARRAY[INDEX])
               CATMENU[INDEX].OPTIONS[I].SELECTED = TRUE;
      }

CATMENU[INDEX].LENGTH = NUMCHILDREN;

// ADD A BLANK ENTRY TO THE END OF COLUMNNS
      IF (INDEX > 0)
            CATMENU[INDEX].OPTIONS[NUMCHILDREN] = NEW OPTION("----------------------------------------");
   }

// CLEAR OUT REST OF THE EMPTY MENUS, IF THERE ARE SOME
   FOR (I = INDEX; I < CATMENU.LENGTH; I++)
   {
```

FIG. 8G2

```
// MAKE SURE USER DIDN'T CLICK ON AN EMPTY BOX
IF ((CM != -1) && (CATMENU[CM].LENGTH < 1))
   RETURN;

// GET THE CHOSEN CATEGORY FROM THIS CATMENU
IF (CM == -1)
   CHOSENCATEGORY = 0;
ELSE
{
   IF (CATMENU[CM].SELECTEDINDEX == -1)
      RETURN;
   CHOSENCATEGORY = CATMENU[CM].OPTIONS[CATMENU[CM].SELECTEDINDEX].VALUE;
}

// IF NO CHILDREN, THEN USER IS DONE;
IF (C[CHOSENCATEGORY]==NULL)
{
   DOCUMENT.LISTITEMFORSALE.CATEGORY1.VALUE = CHOSENCATEGORY;
   NUMCHILDREN = 0;
}
ELSE
{
   IF (CM != -1)
   {
      IF (DOCUMENT.LISTITEMFORSALE.NAME != "CHANGEPREFERENCESSHOW")
         DOCUMENT.LISTITEMFORSALE.CATEGORY1.VALUE = "";
      ELSE
         DOCUMENT.LISTITEMFORSALE.CATEGORY1.VALUE = CHOSENCATEGORY;
   }
   NUMCHILDREN = C[CHOSENCATEGORY].LENGTH;
}

// FILL UP THE NEXT BASED ON THE CHOSENCATEGORY
IF ((CM+1) < CATMENU.LENGTH)
{
   FOR (I = 0; I < NUMCHILDREN; I++)
   {
      CATID = C[CHOSENCATEGORY][I];
      CATNAME = (C[CATID]==NULL) ? N[CATID] : N[CATID]+ " ->";
      CATMENU[CM+1].OPTIONS[I] = NEW OPTION(CATNAME, CATID);
   }
   CATMENU[CM+1].LENGTH = NUMCHILDREN;
}

// CLEAR OUT ALL MENUS TO THE RIGHT OF THIS MENU
FOR (I = CM+2; I < CATMENU.LENGTH; I++)
{
```

*FIG. 8H2*

```
      CATMENU[I].LENGTH = 0;
   }

// ADD A BLANK ENTRY TO THE END OF EACH COLUMNN THAT WAS AFFECTED
   FOR (I = CM+1; I < CATMENU.LENGTH; I++)
   {
      IF (I)
         CATMENU[I].OPTIONS[CATMENU[I].LENGTH] = NEW OPTION("----------------------------------------");
   }
}
// THIS JS COMMENT IS ALSO AT THE END OF THE HTML COMMENT ABOVE -->
</SCRIPT>
<BR>
<TABLE BORDER="1" CELLPADDING="0" CELLSPACING="0"><TR><TD>
<TABLE BORDER="0" CELLPADDING="3" CELLSPACING="0" WIDTH="100%">
   <TR BGCOLOR="#EFEFEF">
      <TD COLSPAN = 4>
         <FONT SIZE="3"><B>CATEGORY</B> <FONT SIZE="2"
COLOR="#006600">REQUIRED</FONT></FONT>&NBSP;&NBSP;&NBSP;&NBSP;<FONT SIZE="2">YOU HAVE CHOSEN CATEGORY #
<INPUT NAME=CATEGORY1 TYPE=TEXT SIZE=5 VALUE=""
ONCHANGE="INITMENU(DOCUMENT.LISTITEMFORSALE.CATEGORY1.VALUE);"></INPUT><BR>
<BR>JUST CLICK IN THE BOXES BELOW FROM LEFT TO RIGHT UNTIL YOU HAVE FOUND THE APPROPRIATE CATEGORY FOR YOUR
ITEM.<BR>THE CHOSEN CATEGORY NUMBER WILL APPEAR IN THE SMALL BOX TO INDICATE THAT YOU HAVE MADE A VALID
SELECTION.<BR>
</TD>
   </TR>
</TABLE>
<TABLE BORDER = 0 CELLPADDING = 3 CELLSPACING = 0>
   <TR>
      <TD ALIGN = LEFT>
         <SELECT NAME="CATMENU_0" SIZE="12" ONCLICK="CHANGEMENU(0);" ONCHANGE="CHANGEMENU(0);">
            <OPTION>----------------------------------------</OPTION>
         </SELECT>
      </TD>
      <TD>
         <SELECT NAME="CATMENU_1" SIZE="12" ONCLICK="CHANGEMENU(1);" ONCHANGE="CHANGEMENU(1);">
            <OPTION>----------------------------------------</OPTION>
         </SELECT>
      </TD>
      <TD>
```

*FIG. 812*

```
<SELECT NAME="CATMENU_2" SIZE="12" ONCLICK="CHANGEMENU(2);" ONCHANGE="CHANGEMENU(2);">
   <OPTION>------------------------------------</OPTION>
  </SELECT>
 </TD>
 <TD>
   <SELECT NAME="CATMENU_3" SIZE="12" ONCLICK="CHANGEMENU(3);" ONCHANGE="CHANGEMENU(3);">
<OPTION>------------------------------------</OPTION>
   </SELECT>
  </TD>
 </TR>
</TABLE>
</TD></TR></TABLE>
```

*FIG. 8J2*

METHOD AND APPARATUS FOR FACILITATING USER SELECTION OF AN ITEM CATEGORY IN AN ONLINE AUCTION

CLAIM OF PRIORITY

This application is a continuation of U.S. application Ser. No. 09/491,703 filed Jan. 26, 2000, which application is incorporated in its entirety herein by reference.

FIELD OF THE INVENTION

The present invention relates generally to electronic commerce, and, more particularly, to a method and apparatus for facilitating user selection of item categories in an online auction environment.

BACKGROUND OF THE ART

The fundamental changes brought by the Internet and its subset, the World Wide Web ("Web"), have created a new electronic environment that is changing the way business is transacted. The ongoing revolution in the field of information delivery is driving the progress in various areas of everyday life. One area that has benefited from this technological development is the electronic auction area, which reflects the ability of individuals to sell items within an Internet marketplace environment.

Historically, auctions for sale of various items have proven to be very popular. Electronic auctions are also becoming increasingly popular due to their lack of complexity and ease of access. In an electronic auction environment, users connect to servers supporting the auctions and buy and/or sell items over one or more networks, for example including the Internet. Typically, in order to list the items in an efficient manner and to attract buyers, the seller has to specify the name of the item to be auctioned, a short description of the item, and a listing category. Since electronic auctions support an ever-increasing number of users selling a wide array of items, attempts have been made to design efficient interfaces between the users and the companies operating the auctions.

With respect to the category selection process, one previous approach uses a field, which includes all categories, and separate fields for respective subcategories. The user selects an appropriate category and then browses through subcategories until he or she finds the subcategory corresponding to the item to be auctioned. However, the process of browsing through subcategories is time-consuming. Also, the user has to repeat the process for every item that the user intends to auction. Another approach prompts the user to select a category from a listing displayed on a Web page, then a subcategory from a second listing displayed on a subsequent Web page, then a further subcategory, if available, from a third listing displayed in yet another Web page, until the final selection accurately characterizes the item to be auctioned. This approach is also time-consuming and requires a certain amount of effort to be completed.

What is needed is a method for facilitating user selection of an item category that is efficient and easy to use.

SUMMARY OF THE INVENTION

A method and apparatus are disclosed for facilitating category selection by a user in a computerized auction. A category field is provided, containing a plurality of category entries used to categorize an item in the auction. One category entry is selected in the category field and at least one subcategory field is provided, containing a plurality of subcategory entries also used to categorize the item in the auction, the subcategory entries corresponding to the one selected category entry of the plurality of category entries. At least one subcategory entry corresponding to the one selected category entry is further selected in the at least one subcategory field for further processing.

Other features and advantages of the present invention will be apparent from the accompanying drawings, and from the detailed description, which follow below.

BRIEF DESCRIPTION OF THE DRAWINGS

The present invention is illustrated by way of example and not limitation in the figures of the accompanying drawings, in which like references indicate similar elements and in which:

FIGS. 8A-8J2 illustrate an embodiment of the present invention implemented in Javascript language.

DETAILED DESCRIPTION

A method and apparatus for facilitating user selection of an item category for an online auction is described. In the following description, for purposes of explanation, numerous specific details are set forth in order to provide a thorough understanding of the present invention. It will be evident, however, to one skilled in the art that the present invention may be practiced without these specific details.

Figure 1:
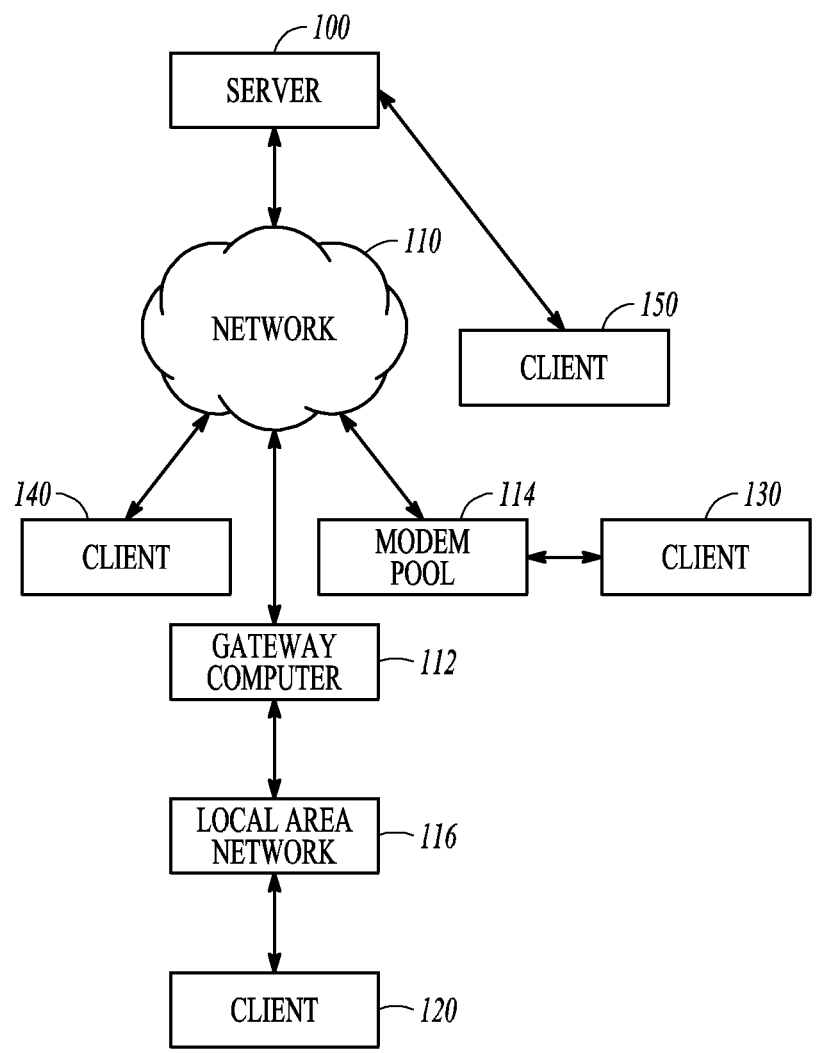
FIG. 1 illustrates a prior art computer network topology.

Referring now to FIG. 1, a diagram illustrates the network environment in which the present invention operates. In this conventional network architecture, a server computer system 100 is coupled to a network 110, preferably a wide-area network. Wide-area network 110 includes the Internet, or other proprietary networks, such as America On-Line™, CompuServe™, Microsoft Network™, and Prodigy™, each of which are well known to those of ordinary skill in the art. Wide-area network 110 may also include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140, 150, possibly connected through wide-area network 110 in various ways or directly connected to server 100. For example, as shown in FIG. 1, client 140 is connected directly to wide-area network 110 through direct or dial-up telephone or other network transmission line. Alternatively, client 130 may be connected to wide-area network 110 through a conventional modem pool 114. The modem pool 114 allows a plurality of client systems to connect with a smaller set of modems in modem pool 114 for connection through wide-area network 110. Those of ordinary skill in the art will understand that a plurality of clients, similar to client 130, may be connected to network 110 using the modem pool 114. Client 150 may also be connected directly to server 100, as shown in FIG. 1, or through a modem (not shown) in a conventional way. In another alternative network typology, wide-area network 110 is connected to a gateway computer 112. Gateway computer 112 is used to route data to client 120 through a local area network (LAN) 116. In this manner, client 120 can communicate with other clients (not shown) through LAN 116 or with server 100 through gateway 112 and wide-area network 110. Alternatively, LAN 116 may be directly connected to server 100.

Using one of a variety of network connection devices, server computer 100 can also communicate directly with client 150. In a particular implementation of this network configuration, a server computer 100 may operate as a web server if the World Wide Web (Web) portion of the Internet is used as wide-area network 110. Using the HTTP protocol and the HTML coding language across a network, web server 100 may communicate across the Web with client 150. In this configuration, client 150 uses a client application program known as a web browser, such as the Netscape™ Navigator™ browser, published by Netscape Corporation of Mountain View, Calif., the Internet Explorer™ browser, published by Microsoft Corporation of Redmond, Wash., the user interface of America On-Line™, or the web browser or HTML translator of any other conventional supplier. Using such conventional browsers and the Web, client 150 may access graphical and textual data or video, audio, or tactile data provided by server 100. Conventional means exist by which client 150 may supply information to web server 100 through the Web 110 and the web server 100 may return processed data to client 150.

Figure 2:
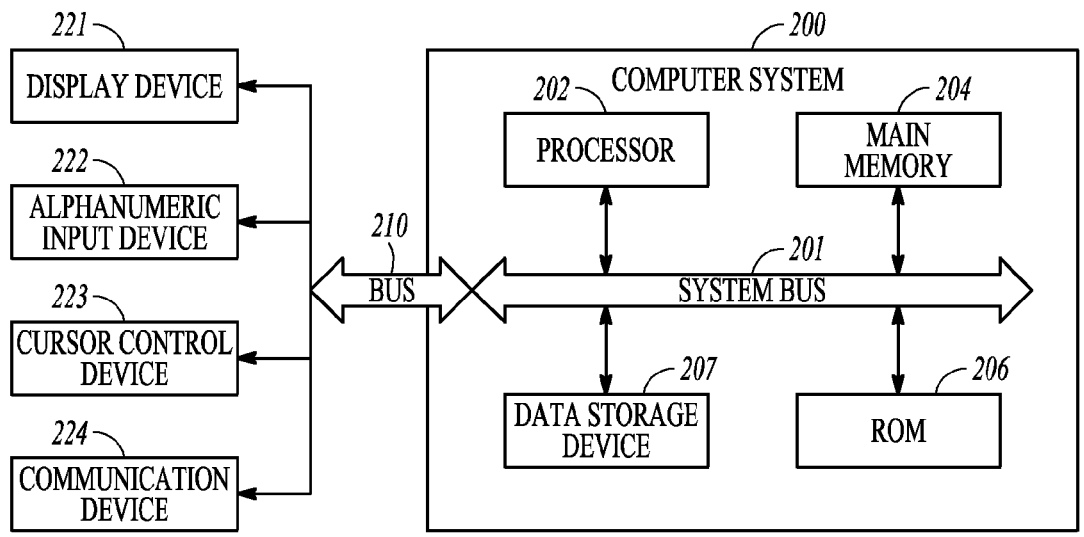
FIG. 2 illustrates the prior art architecture of a conventional computer system.

Having briefly described one embodiment of the network environment in which the present invention operates, FIG. 2 illustrates an example of a computer system 200 illustrating an exemplary client 150 or server 100 computer system in which the features of the present invention may be implemented. Computer system 200 is comprised of a system bus 201, or other communications module similar to the system bus, for communicating information, and a processing module, such as processor 202, coupled with bus 201 for processing information. Computer system 200 further comprises a main memory 204, such as a random access memory (RAM) or other dynamic storage device, coupled to bus 201, for storing information and instructions to be executed by processor 202. Main memory 204 may also be used for storing temporary variables or other intermediate information during execution of instructions by processor 202. Computer system 200 also comprises a read only memory (ROM) 206, and/or other similar static storage device, coupled to bus 201, for storing static information and instructions for processor 202.

An optional data storage device 207, such as a magnetic disk or optical disk, and its corresponding drive may also be coupled to computer system 200 for storing information and instructions. System bus 201 is coupled to an external bus 210, which connects computer system 200 to other devices. Computer system 200 can also be coupled via bus 210 to a display device 221, such as a cathode ray tube (CRT) or a liquid crystal display (LCD), for displaying information to a computer user. For example, graphical or textual information may be presented to the user on display device 221. Typically, an alphanumeric input device 222, such as a keyboard including alphanumeric and other keys, is coupled to bus 210 for communicating information and/or command selections to processor 202. Another type of user input device is cursor control device 223, such as a conventional mouse, touch mouse, trackball, or other type of cursor direction keys, for communicating direction information and command selection to processor 202 and for controlling cursor movement on display 221. A fully loaded computer system may optionally include video, camera, speakers, sound card, and many other similar conventional options.

Alternatively, the client 150 can be implemented as a network computer or thin client device, such as the WebTV Networks™ Internet terminal or the Oracle™ NC. Client 150 may also be a laptop or palm-top computing device, such as the Palm Pilot™. Such a network computer or thin client device does not necessarily include all of the devices and features of the above-described exemplary computer system. However, the functionality of the present invention may nevertheless be implemented with such devices.

A communication device 224 is also coupled to bus 210 for accessing remote computers or servers, such as web server 100, or other servers via the Internet, for example. The communication device 224 may include a modem, a network interface card, or other well known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The present invention includes various processing steps, which will be described below. The steps of the present invention may be embodied in machine or computer executable instructions. The instructions can be used to cause a general purpose or special purpose processor, which is programmed with the instructions to perform the steps of the present invention. Alternatively, the steps of the present invention may be performed by specific hardware components that contain hardwired logic for performing the steps, or by any combination of programmed computer components and custom hardware components. While embodiments of the present invention will be described with reference to the Web, the method and apparatus described herein is equally applicable to other network infrastructures or other data communications systems.

Figure 3:
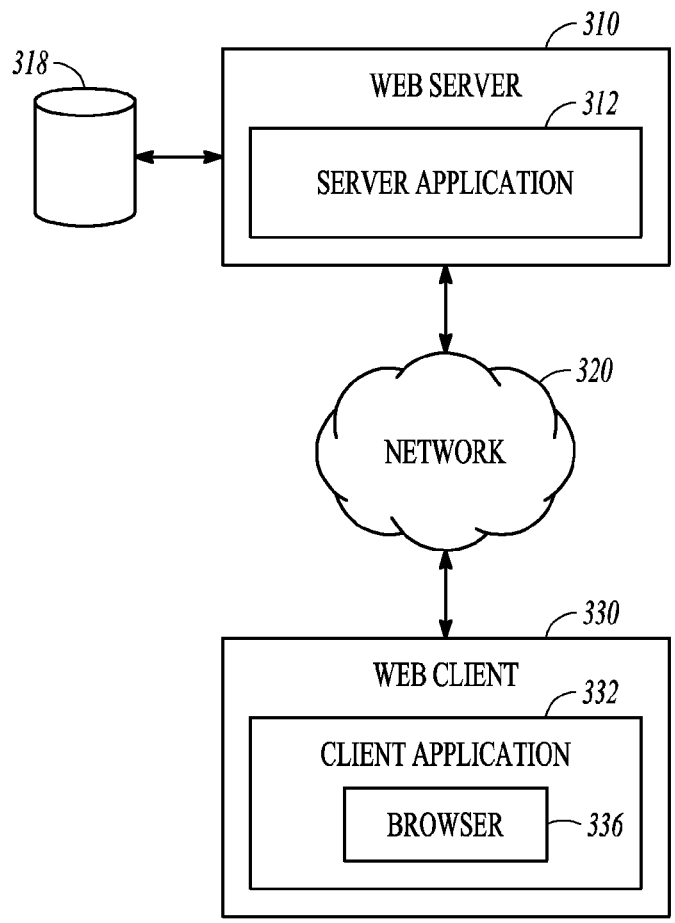
FIG. 3 illustrates the computer network architecture of one embodiment.

Referring now to FIG. 3, one embodiment of the network configuration of the present invention is illustrated. In one embodiment, a web server 310 is coupled with web client 330 through the wide-area network 320, such as the Internet. As described above, web server 310 and web client 330 may be implemented as conventional computer systems. Software application programs for implementing the present invention run on web server 310 and web client 330. As shown in FIG. 3, the server portion of the application software of the present invention is shown as server application 312. Also illustrated in FIG. 3 is the client side portion of the application software of the present invention, shown as client application 332. In addition, in one embodiment, web server 310 has access to a user database 318, or an information store, for storing and managing user information. As shown in FIG. 3, the user database 318 may be operated as a database system independent of, but accessible to, the web server 310 through a local area network (not shown) or other means of communication. Alternatively, user database 318 may be incorporated into web server 310.

Generally, the present invention provides a method and apparatus for facilitating user selection of item categories in an online auction, made accessible across a wide-area network 320, such as the Internet. Referring again to FIG. 3, the client application software 332 includes at least one basic functional component, shown in one embodiment as client browser 336, which contains display and category selection capabilities. One embodiment of the present invention is implemented in Javascript language as shown in FIGS. 8A-8J2.

Figure 6A:
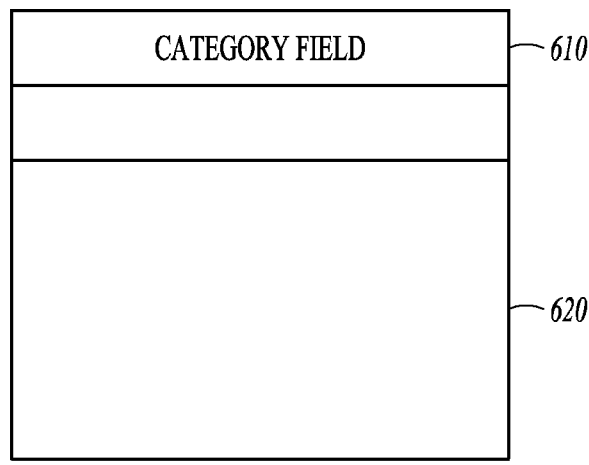
FIG. 6a illustrates an exemplary table in the auction database, which stores item categories and subcategories.
Figure 6B:
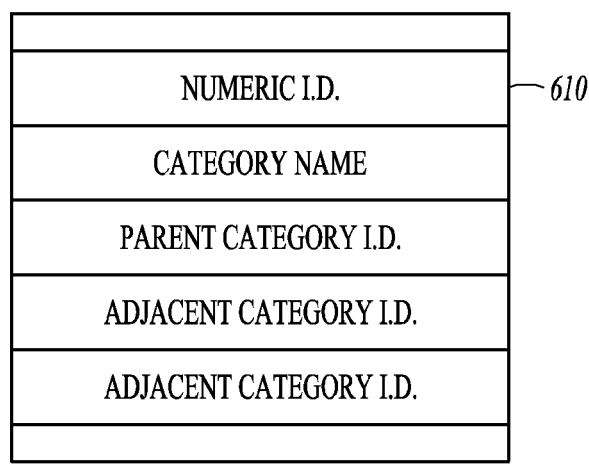
FIG. 6b illustrates an exemplary table in the auction database, which stores identification parameters for each category or subcategory.

According to one embodiment of the present invention, items being the object of an online auction are classified in categories and subcategories. As illustrated in FIG. 6a, each category is stored in a field 610 of a table 620 residing in database 318. Similarly, each subcategory resides in a different field 610 in the same database 318. The server application 312 accesses the table 620 in database 318 to retrieve and send stored category and subcategory information to the client application 332. As shown in FIG. 6b, each field 610 of one category or subcategory separately stores a category number or numeric I.D. of the category or subcategory, a name of the category or subcategory, a numeric I.D. of the parent category or subcategory, and two numeric I.D.s of categories or subcategories stored in adjacent fields.

Figure 7:
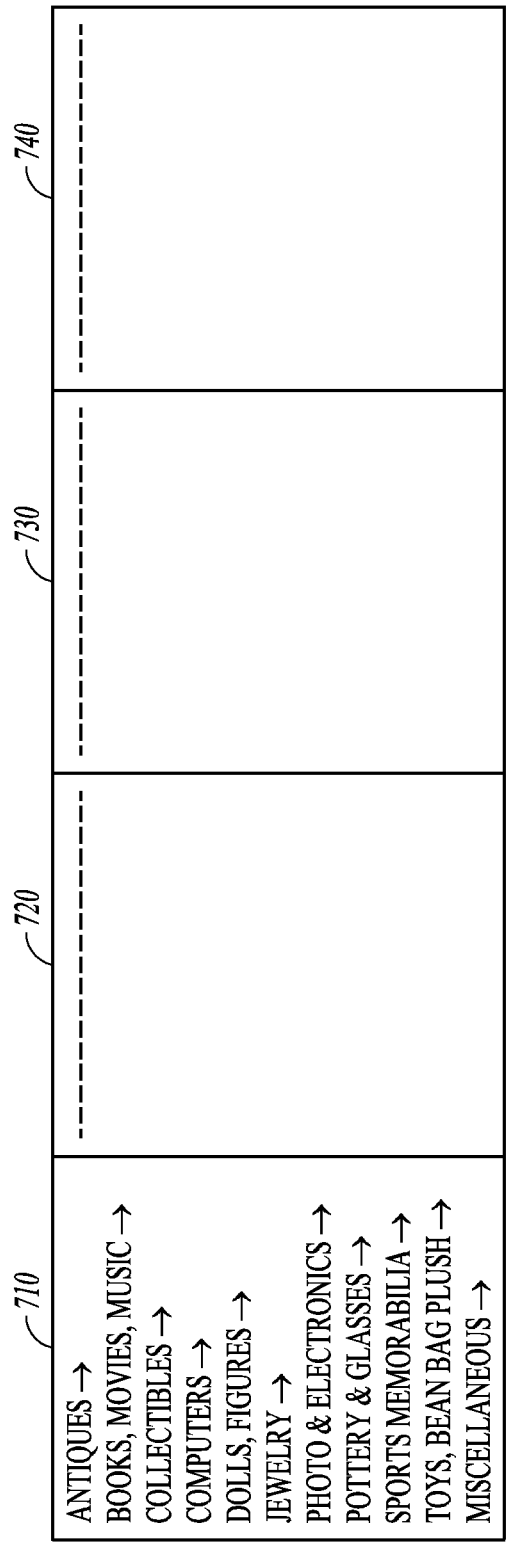
FIG. 7 illustrates one embodiment of a user interface used in the process of selecting a item category in an online auction.

In one embodiment, the client browser 336 receives the category and subcategory information and displays the information hierarchically in graphically distinct areas, as shown in FIG. 7. Each category is displayed in a category field 710. The category field 710 is a page mark-up language document and contains multiple categories, arranged in alphabetical order. In one embodiment, the category field 710 contains twelve categories. Alternatively, other categories may be included within the category field 710. Subcategories are displayed in several subcategory fields. A first subcategory field 720, a page mark-up language document similar to the category field, is adjacent to category field 710 and contains subcategories of each category displayed in field 710. In one embodiment, the number of subcategories is different for each displayed category. A second subcategory field 730 contains subcategories of each subcategory displayed in field 720. A third subcategory field 740 contains subcategories of each subcategory displayed in field 730. A category number associated with each category and its respective subcategories is also displayed by the browser 336. The category number enables the user to select the associated category and subcategories without going through the entire selection process as shown in detail below.

The category selection process is implemented using the client browser 336 and the server application 312. In one embodiment, the client browser 336 and the server application 312 operate for facilitating category selection by the user as shown in FIGS. 4 and 5 and described in further detail below.

Figure 4:
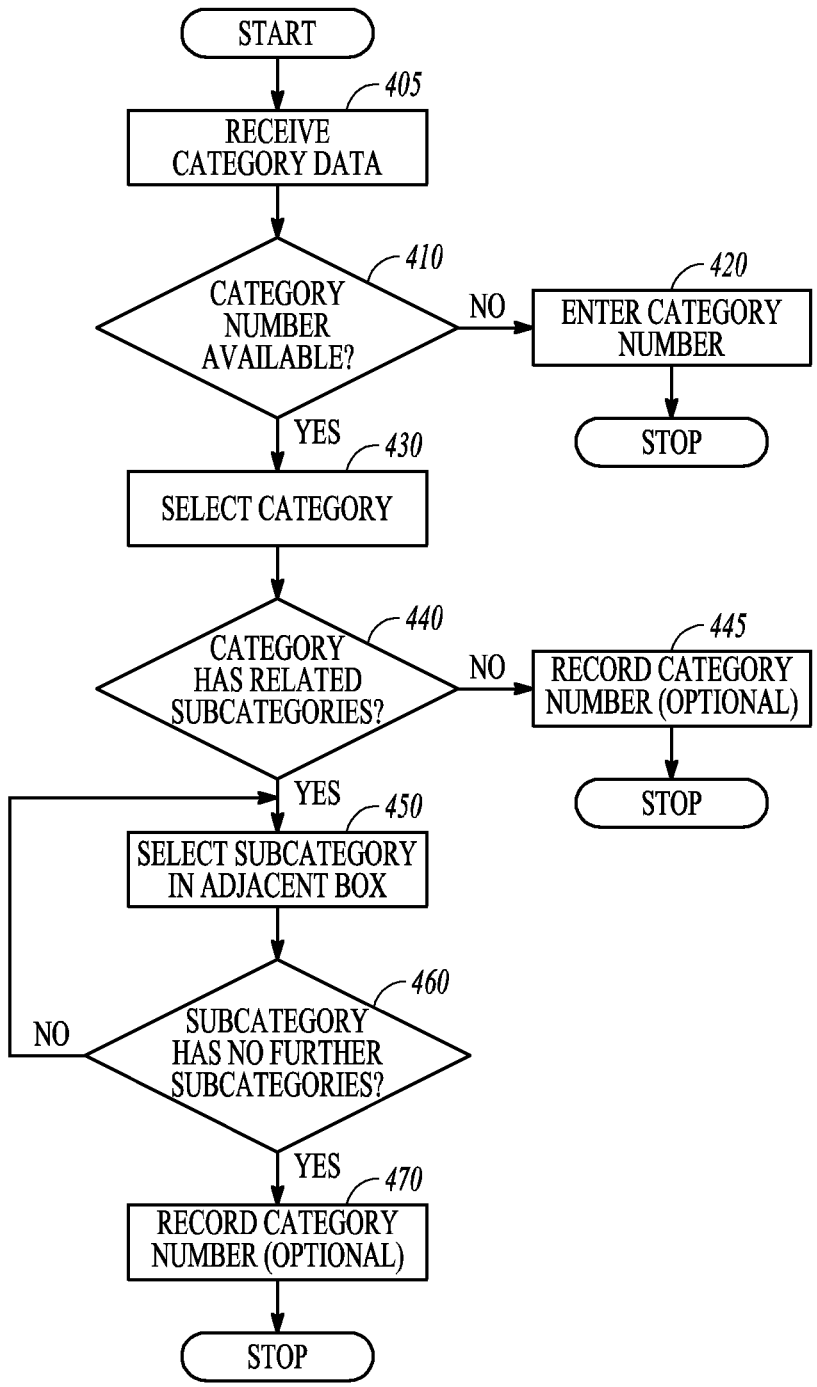
FIG. 4 is a flowchart representing the process of selecting an item category in an online auction from a user's perspective.

FIG. 4 shows a flowchart representing the process of selecting an item category in an online auction from a user's perspective. Referring to FIG. 4, in one embodiment, the client browser 336 within the client application 332 receives category hierarchy data from the server application 312 at step 405. The category hierarchy data includes category and subcategory information. Using the category data, the client browser 336 performs the category selection process as follows. Once the user is ready to select an item category, at step 410, a decision is made whether a category number is available to the user. If the user has previously selected the same category and subcategories and has stored the category number associated with the category and the respective subcategories, the user enters the category number at step 420. As a result, based on the category number, the respective category and related subcategories are selected and displayed by the client browser 336 in the respective fields.

If the category number or numeric I.D. is not available, then, at step 430, the user selects a category from a list of available categories displayed in an interactive category area. Next, the client browser 336 performs a test whether the selected category has related subcategories at step 440. If the selected category has no related subcategories, then the user has the option to record the category number of the selected category at step 445 and may proceed further with the item registration process. Alternatively, if related subcategories exist, the user selects a subcategory from a list of available subcategories related to the selected category at step 450. The list of available subcategories is displayed in an interactive area adjacent to the category area. A test whether the subcategory has no further related subcategories is performed by the client browser at step 460. If no further related subcategories exist, then the user may record the category number of the selected combination of category and subcategory at step 470 and proceed further with the item registration process. Otherwise, if further subcategories related to the selected subcategory are still available, the user goes back to step 450 and repeats the subcategory selection process. The embodiment described above allows the client browser 336 to perform the category selection process using category data and Javascript code supplied by the server application 312. Alternatively, the server application 312 may interact with the user during the selection process and may perform other functions as described in further detail below.

Figure 5:
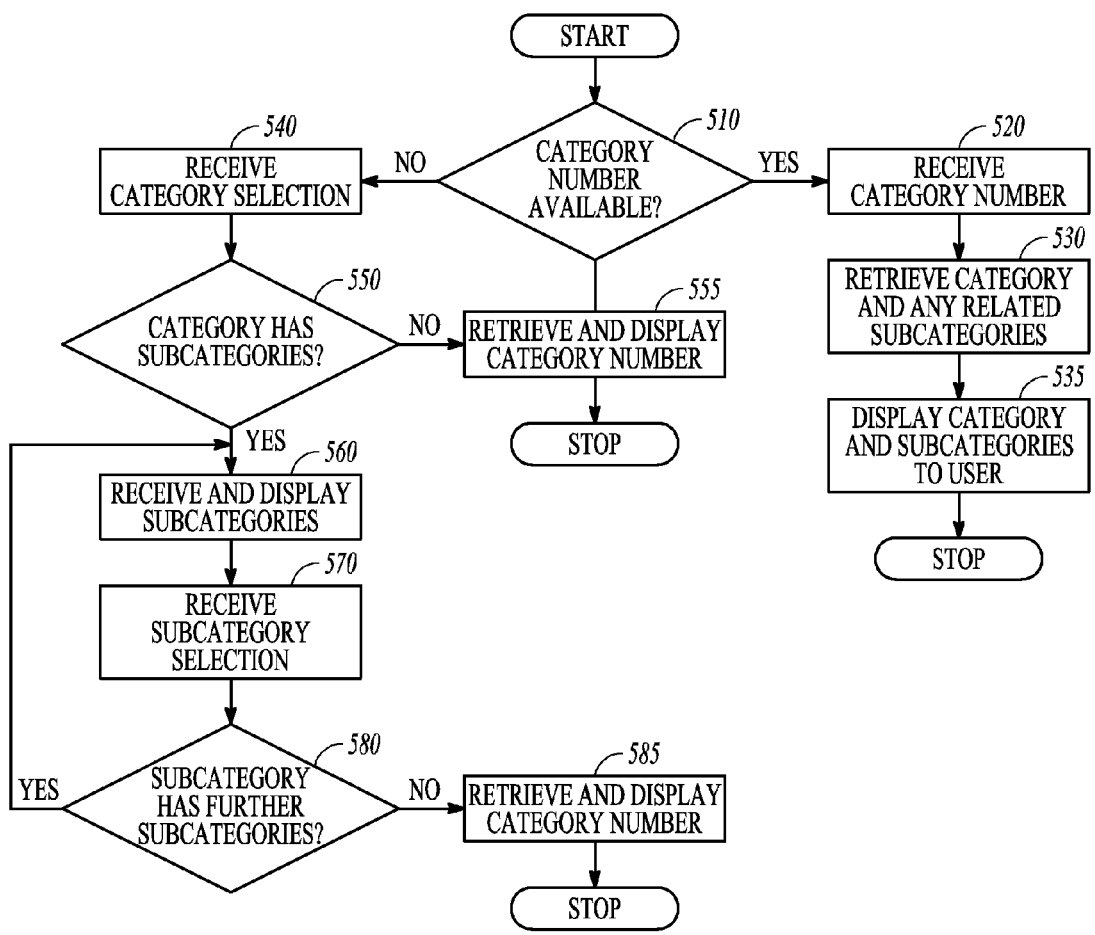
FIG. 5 is a flowchart representing the process of selecting an item category in an online auction from a server's perspective.

FIG. 5 shows a flowchart representing an alternate embodiment of the process of selecting an item category in an online auction from the server's perspective. Referring to FIG. 5, a decision is made at step 510 whether a category number is available to the user. If the user has previously accessed the auction and has selected the same item category and subcategories, and a category number is available, then the server application 312 receives the category number at step 520. The server application 312 accesses the user database 318 and retrieves at step 530 the category information corresponding to the category number, as well as any related subcategories. The server application 312 subsequently forwards the information to the client application 332 and the category and subcategories are displayed for the user at step 535.

If the category number is not available, then the server application 312 receives a category selection from the client application 332 at step 540. At step 550, a test whether the category has any subcategories is performed. The server application 312 accesses the database 318 and determines if related subcategories exist. If no subcategories exist for the selected category, the server application 312 retrieves and returns the category number to the client application 332, the category number being displayed to the user at step 555. If the selected category has related subcategories, the server application 312 retrieves the subcategories from database 318 and forwards the information to the client application 332. The subcategories are then displayed at step 560. Once the user selects a subcategory, the server application 312 receives the subcategory selection at step 570, and subsequently accesses the database 318 at step 580 to determine if the selected subcategory has any further subcategories. If no further subcategories exist, the server application 312 retrieves and returns the category number to the client application 332, the category number being displayed to the user at step 585. Alternatively, if the selected subcategory has a new set of subcategories, steps 560 and 570 are repeated for the new set of subcategories.

Thus, a method and apparatus for facilitating user selection of item categories in an online auction has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
receiving an identifier;
determining that the identifier is associated with a selection in a user interface of a combination of a category and a subcategory under which items included in listings in a networked marketplace environment are classified; and
based on the receiving of the identifier and the determining that the identifier is associated with the selection in the user interface of the combination of the category and the subcategory, automatically reselecting in the user interface the combination of the category and the subcategory, the receiving, determining and reselecting being performed by one or more processors.

2. The method of claim 1, wherein the determining that the identifier is associated with the selection in the user interface of the combination of the category and the subcategory is based on the received identifier matching a stored identifier, the stored identifier having being previously associated with the selection in the user interface of the category and the subcategory.

3. The method of claim 1, further comprising, based on the reselecting in the user interface of the combination of the category and the subcategory, completing a registration of a listing of an item as being classified under the reselected category and subcategory.

4. The method of claim 1, wherein the association of the stored identifier with the selection in the user interface of the category and subcategory is based on inputs received when information pertaining to categories and subcategories is represented in graphically distinct areas of the user interface.

5. The method of claim 4, wherein the graphically distinct areas include a category area and one or more subcategory areas.

6. The method of claim 4, wherein the information pertaining to the categories and subcategories is derived from database records corresponding to the categories and subcategories.

7. The method of claim 6, wherein the database records include fields identifying categories or subcategories that are adjacent to other categories or other subcategories.

8. A system comprising:
one or more modules configured to, using one or more processors:
receive an identifier;
determine that the identifier is associated with a selection in a user interface of a combination of a category and a subcategory under which items included in listings in a networked marketplace environment are classified; and
based on the receiving of the identifier and the determining that the identifier is associated with the selection in the user interface of the combination of the category and the subcategory, automatically reselecting in the user interface the combination of the category and the subcategory.

9. The system of claim 8, wherein the determining that the identifier is associated with the selection in the user interface of the combination of the category and the subcategory is based on the received identifier matching a stored identifier; the stored identifier having being previously associated with the selection in the user interface of the category and the subcategory.

10. The system of claim 8, wherein the one or more modules are further configured to, based on the reselecting in the user interface of the combination of the category and the subcategory, completing a registration of a listing of an item as being classified under the reselected category and subcategory.

11. The system of claim 8, wherein the association of the stored identifier with the selection in the user interface of the category and subcategory is based on inputs received when information pertaining to categories and subcategories is represented in graphically distinct areas of the user interface.

12. The system of claim 11, wherein the graphically distinct areas include a category area and one or more subcategory areas.

13. The system of claim 11, wherein the information pertaining to the categories and subcategories is derived from database records corresponding to the categories and subcategories.

14. The system of claim 13, wherein the database records include fields identifying categories or subcategories that are adjacent to other categories or other subcategories.

15. A non-transitory computer-readable medium comprising a set of instructions that, when executed by one or more processors, cause the one or more processors to perform operations, the operations comprising:
receiving an identifier;
determining that the identifier is associated with a selection in a user interface of a combination of a category and a subcategory under which items included in listings in a networked marketplace environment are classified; and
based on the receiving of the identifier and the determining that the identifier is associated with the selection in the user interface of the combination of the category and the subcategory, automatically reselecting in the user interface the combination of the category and the subcategory.

16. The non-transitory computer-readable medium of claim 15, wherein the determining that the identifier is associated with the selection in the user interface of the combination of the category and the subcategory is based on the received identifier matching a stored identifier, the stored identifier having being previously associated with the selection in the user interface of the category and the subcategory.

17. The non-transitory computer-readable medium of claim 15, the operations further comprising, based on the reselecting in the user interface of the combination of the category and the subcategory, completing a registration of a listing of an item as being classified under the reselected category and subcategory.

18. The non-transitory computer-readable medium of claim 15, wherein the association of the stored identifier with the selection in the user interface of the category and subcategory is based on inputs received when information pertaining to categories and subcategories is represented in graphically distinct areas of the user interface.

19. The non-transitory computer-readable medium of claim 18, wherein the graphically distinct areas include a category area and one or more subcategory areas.

20. The non-transitory computer-readable medium of claim 18, wherein the information pertaining to the categories and subcategories is derived from database records corresponding to the categories and subcategories.

\* \* \* \* \*

UNITED STATES PATENT AND TRADEMARK OFFICE
CERTIFICATE OF CORRECTION

PATENT NO. : 9,058,094 B2  
APPLICATION NO. : 14/218425  
DATED : June 16, 2015  
INVENTOR(S) : Poon Page 1 of 1

It is certified that error appears in the above-identified patent and that said Letters Patent is hereby corrected as shown below:

In the claims

Column 7, line 22, Claim 1, delete "determining" and insert --determining,--, therefor Column 8, line 1, Claim 9, delete "identifier;" and insert --identifier,--, therefor Signed and Sealed this
Twenty-third Day of February, 2016

Michelle K. Lee
*Director of the United States Patent and Trademark Office*